United States Patent
Christoffersson et al.

(10) Patent No.: US 9,402,249 B2
(45) Date of Patent: Jul. 26, 2016

(54) METHODS AND APPARATUS FOR OPERATING TIMER(S) FOR STAND-ALONE HS-DPCCH

(71) Applicant: Telefonaktiebolaget L M Ericsson (publ), Stockholm (SE)

(72) Inventors: Jan Christoffersson, Luleå (SE); Waikwok Kwong, Solna (SE); Jose Luis Pradas, Stockholm (SE); Edgar Ramos, Espoo (FI)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 0 days.

(21) Appl. No.: 14/398,905

(22) PCT Filed: May 15, 2013

(86) PCT No.: PCT/SE2013/050551
§ 371 (c)(1),
(2) Date: Mar. 3, 2015

(87) PCT Pub. No.: WO2013/172778
PCT Pub. Date: Nov. 21, 2013

(65) Prior Publication Data
US 2015/0156761 A1    Jun. 4, 2015

Related U.S. Application Data

(60) Provisional application No. 61/647,304, filed on May 15, 2012.

(51) Int. Cl.
*H04W 72/00* (2009.01)
*H04W 72/04* (2009.01)
(Continued)

(52) U.S. Cl.
CPC ........ *H04W 72/0413* (2013.01); *H04W 76/068* (2013.01); *H04M 1/72519* (2013.01)

(58) Field of Classification Search
CPC ..... H04W 72/04; H04W 8/245; H04W 28/04; H04M 1/72519
USPC .......... 455/450, 550.1, 418; 370/329
See application file for complete search history.

(56) References Cited

U.S. PATENT DOCUMENTS

2009/0225709 A1* 9/2009 Wager ............... H04W 72/0413
370/329
2010/0074203 A1* 3/2010 Pani .................. H04W 72/0413
370/329

(Continued)

OTHER PUBLICATIONS

PCT International Search Report for International application No. PCT/SE2013/050551, Dec. 19, 2013.
(Continued)

*Primary Examiner* — Danh Le
(74) *Attorney, Agent, or Firm* — Patents on Demand, P.A.; Brian K. Buchheit; Scott M. Garrett

(57) ABSTRACT

In one of its aspects the technology disclosed herein concerns a wireless terminal (30) which is configured to communicate over a radio interface (32) with a radio access network. The wireless terminal (30) comprises a timer (52) and a timer controller (54). The timer (52) is configured to determine when to release an Enhanced Dedicated Channel (E-DCH) resource utilized on an uplink from the wireless terminal (30) to the network. The timer controller (54) is configured to initialize or adjust the timer with a timer value received from the network, the timer value being for a mode in which the network has commanded the wireless terminal to request a common E-DCH resource.

17 Claims, 9 Drawing Sheets

(51) Int. Cl.
*H04W 76/06* (2009.01)
*H04M 1/725* (2006.01)

(56) References Cited

U.S. PATENT DOCUMENTS

| | | | | |
|---|---|---|---|---|
| 2011/0194433 A1* | 8/2011 | Song | ................... | H04W 76/046 370/252 |
| 2012/0002545 A1* | 1/2012 | Watfa | ................... | H04W 48/06 370/235 |
| 2012/0230261 A1* | 9/2012 | Pradas | ................. | H04W 74/08 370/329 |
| 2013/0083756 A1* | 4/2013 | Pradas | ................ | H04W 76/046 370/329 |

OTHER PUBLICATIONS

3GPP TSG-RAN WG2 Meeting #78; Prague, Czech Republic; Discussion on the implicit release timer for standalone HS-DPCCH transmission (R2-122117), May 21-25, 2012.
3GPP TSG-RAN WG2 #77bis; Jeju, South Korea; RAN2 related issues on stand-alone HS-DPCCH (R2-121791), Mar. 26-30, 2012.
Draft Report of 3GPP TSG RAN WG2 #77bis, Jeju, Korea, Mar. 26-30, 2012.
3GPP TSG RAN WG1 Meeting #66; Athens, Greece; Physical channels and procedures to support standalone HS-DPCCH in CELL-FACH (R1-112680), Aug. 22-26, 2011.
3GPP TSG-RAN WG2 #78; Prague, Czech Republic; Standalone HS-DPCCH issues in CELL-FACH (R2-122717), May 21-25, 2012.
3GPP TSG RAN WG2 #79; Qingdao, China; Open issues from email discussion on HS-DPCCH, Concurrent 2ms and 10ms TTI and common E-RGCH sub-features in FE-FACH (R2-123360), Aug. 13-17, 2012.
3GPP TSG-RAN WG2#79Bis; Bratislava, Slovakia; Interaction of Tb and Tbhs Timer in CELL-FACH (R2-124505), Oct. 8-Dec. 2012.
PCT Written Opinion of the International Searching Authority for International application No. PCT/SE2013/050551, Dec. 12, 2013.
3GPP TS 25.321 V10.3.0 (Jun. 2011) 3rd Generation Partnership Project; Technical Specification Group Radio Access Network; Medium Access Control (MAC) protocol specification (Release 10), 2011.
3GPP TS 25.331 V10.4.0 (Jun. 2011) 3rd Generation Partnership Project; Technical Specification Group Radio Access Network; Radio Resource Control (RRC); Protocol specification (Release 10) (Note: Due to size, this reference has been split into 10 separate documents), 2011.
3GPP TS 25.321 V10.5.0 (Dec. 2011) 3rd Generation Partnership Project; Technical Specification Group Radio Access Network; Medium Access Control (MAC) protocol specification (Release 10), 2011.
3GPP TS 25.214 V10.6.0 (Mar. 2012) 3rd Generation Partnership Project; Technical Specification Group Radio Access Network; Physical layer procedures (FDD) (Release 10), 2012.
3GPP TS 25.331 V10.7.0 (Mar. 2012) 3rd Generation Partnership Project; Technical Specification Group Radio Access Network; Radio Resource Control (RRC); Protocol specification (Release 10) (Note: Due to size, this reference has been split into 10 separate documents), 2012.

* cited by examiner

METHODS AND APPARATUS FOR OPERATING TIMER(S) FOR STAND-ALONE HS-DPCCH

PRIORITY

This nonprovisional application is a U.S. National Stage Filing under 35 U.S.C. §371 of International Patent Application Serial No. PCT/SE2013/050551, filed May 15, 2013 and entitled "Methods and Apparatus for Operating Timer(s) for Stand-Alone HS-DPCCH" which claims priority to U.S. Provisional Patent Application No. 61/647,304 filed on May 15, 2012, which is hereby incorporated by reference.

TECHNICAL FIELD

The technology relates to telecommunications, and particular to method and apparatus for utilizing an uplink channel known as the Enhanced Dedicated Channel (E-DCH).

BACKGROUND

In a typical cellular radio system, wireless terminals (also known as mobile stations and/or user equipments (UEs)) communicate via a radio access network (RAN) to one or more core networks. The radio access network (RAN) covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions of the radio access network, several base stations are typically connected (e.g., by landlines or microwave) to a controller node (such as a radio network controller (RNC) or a base station controller (BSC)) which supervises and coordinates various activities of the plural base stations connected thereto. The radio network controllers are typically connected to one or more core networks.

The Universal Mobile Telecommunications System (UMTS) is a third generation mobile communication system, which evolved from the second generation (2G) Global System for Mobile Communications (GSM). UTRAN is essentially a radio access network using wideband code division multiple access for user equipment units (UEs). In a forum known as the Third Generation Partnership Project (3GPP), telecommunications suppliers propose and agree upon standards for third generation networks and UTRAN specifically, and investigate enhanced data rate and radio capacity. The 3GPP has developed specifications for the Evolved Universal Terrestrial Radio Access Network (E-UTRAN). The Evolved Universal Terrestrial Radio Access Network (E-UTRAN) comprises the Long Term Evolution (LTE) and System Architecture Evolution (SAE). Long Term Evolution (LTE) is a variant of a 3GPP radio access technology wherein the radio base station nodes are connected to a core network (via Access Gateways, or AGWs) rather than to radio network controller (RNC) nodes. In general, in LTE the functions of a radio network controller (RNC) node are distributed between the radio base stations nodes (eNodeB's in LTE) and AGWs. As such, the radio access network (RAN) of an LTE system has an essentially "flat" architecture comprising radio base station nodes without reporting to radio network controller (RNC) nodes.

One result of the forum's work is the High Speed Downlink Packet Access (HSDPA) for the downlink, which was introduced in 3GPP WCDMA specification Release 5. HSDPA features a high speed channel (HSC) controller that functions, e.g., as a high speed scheduler by multiplexing user information for transmission over the entire HS-DSCH bandwidth in time-multiplexed intervals (called transmission time intervals (TTI)). Since HSDPA uses code multiplexing, several users can be scheduled at the same time.

The High Speed Downlink Packet Access (HSDPA) was followed by introduction of High Speed Uplink Packet Access (HSUPA) with its Enhanced Dedicated Channel (E-DCH) in the uplink in 3GPP WCDMA specification Release 6. E-DCH is dedicated uplink channel (from a user equipment (UE) to a Node-B) that has been enhanced for IP transmission Enhancements include using a short transmission time interval (TTI); fast hybrid ARQ (HARQ) between mobile terminal and the Node-B (with soft combining); scheduling of the transmission rates of mobile terminals from the Node-B. In addition, E-DCH retains majority of the features characteristic for dedicated channels in the uplink.

E-DCH comes with several channels from each UE. For example, the DPCCH carries pilot symbols and parts of the outband control signaling. Remaining outband control signalling for the enhanced uplink, e.g., scheduling requests, is carried on the E-DPCCH (E-Dedicated Physical Control Channel), while the E-DPDCH (E-Dedicated Physical Data Channel) carries the data transmitted using the enhanced uplink feature.

In 3GPP Rel-11, work is ongoing to improve the end user experience and performance especially in the CELL_FACH state. CELL_FACH is an RRC state in which the UE is known on cell level (i.e., has a cell id and a UE identifier assigned for such a cell), has a layer 2 connection, but does not have a dedicated physical layer resource. Instead, common physical layer resources are shared between users in CELL_FACH.

E-DCH is normally used as a dedicated channel in CELL_DCH state with one separate resource allocated per user. But E-DCH can also be used in CELL_FACH state by having a pool of E-DCH resources that can be temporarily assigned to a user in CELL_FACH. These resources are called common E-DCH resources. E-DCH resources are normally managed by the radio network controller (RNC), but the pool of common E-DCH resources is managed by a NodeB. The common E-DCH configurations are broadcasted to wireless terminals (UEs) in the cell.

The procedure to access the common E-DCH channel in CELL_FACH starts in the same way as Rel-99 RACH transmission, i.e., with preamble power ramping using randomly selected preamble signatures. Having detected the preamble, the NodeB acknowledges reception with an AICH sequence. The NodeB also informs the UE which common E-DCH resource it has assigned to the UE.

A common E-DCH resource is defined as:
Initial Serving Grant Value
E-DCH Transmission Time Interval
E-AGCH information
HARQ information
Uplink DPCH power control information
E-DPCCH information
E-DPDCH information
F-DPCH information
E-HICH information
UL scrambling code
HS-DPCCH parameters CELL_FACH is a state commonly used for battery and radio efficient use of radio resources for UEs in which data typically arrives in bursts with longer idle periods in between. Ideally, an UE should be inactive between the bursts but still be capable of swiftly moving into an active state when there are packets to send or receive. For this kind of on-off type traffic patterns, the connection set-up latency and signaling load has a significant impact both on the preservation of the device battery and on the transmission quality perceived by the end user.

Information about a network and a serving cell is broadcast to all wireless terminals in a number of system information blocks (SIB5). E-DCH resource configurations are broadcasted in System Information Block 5 (SIB5). Some of the broadcasted parameters are common for all common E-DCH resources, for instance the TTI (Time Transmission Interval) configuration.

One of the enhancements for standardization in Rel 11 was the stand-alone HS-DPCCH. Stand-alone HS-DPCCH means that the network can command the UE to request a common E-DCH resource. When the UE receives the command, the UE requests a common E-DCH resource and the network may allocate it. If the UE does not have any data to transmit, the UE only sends only the DPCCH during the synchronization procedure AA. Synchronization procedure AA may be used when one downlink F-DPCH and uplink dedicated physical channels are to be set up on a frequency as a consequence of an Enhanced Uplink in CELL_FACH procedure. Synchronization procedure AA is used to synchronize the UL of the UE with the Cell, and is a faster procedure than the traditional synchronization because the UE maintains certain sync during the Random Access. Synchronization procedure AA is explained, e.g., in 3GPP TS 25.214. Physical layer procedures (FDD). V.10.6.0, section 4.3.2.3A. Afterwards the UE will transmit the DPCCH, the HS-DPCCH, and will transmit the E-DPDCH and E-DPCCH to convey the Scheduling Information to the network for collision resolution purposes. In this case, the request of the common E-DCH resources is not due to UL data to be transmitted, but is initiated upon the network request.

The HS-DPCCH channel is used to aid the DL transmissions on HS-DSCH by providing ACK/NACK and CQI reports to the Node B. Prior to Rel 8, the HS-DPCCH operated without any feedback in CELL_FACH. In Rel 8, the HS-DSCH could get this feedback if the UE was using a common E-DCH resource, in which case the HS-DPCCH was transmitted after content resolution until the UE released the E-DCH resource, e.g., when the UE had emptied the UL buffer and a timer known as the Tb timer had expired.

In Rel 11, the stand-alone HS-DPCCH can be requested by the Node B when there is DL data to the UE on HS-DSCH. This can be requested even if the UE has no UL data on E-DCH. The request is done by an HS-SCCH order to the UE, which upon reception starts the process of obtaining a common E-DCH resource using standard procedure, i.e., power ramping using a signature corresponding to a common E-DCH resource. When the UE receives an acknowledgement (ACK) it immediately starts to transmit the DPCCH and after a short synchronization period also the HS-DPCCH. The HS-DPCCH is transmitted until the E-DCH resource is released. A comparable action may be performed if a resource redirection (e.g. NACK in AI) but an index in E-AI is not configured, as long as there is no NACK in the E-AI.

There are two timers defined for the case of implicit release of the E-DCH, e.g., release done by the UE upon expiration of a timer. The first timer is the Ths-dpcch which is restarted after every reception of a downlink (DL) protocol data unit (PDU). The second timer is Tb, which is started when the uplink (UL) buffer is empty. The Tb timer is the reset every time there is new data in the UL buffer or when there is DL data received and restarted whenever the uplink buffer is empty again. The Tb is typically started for the first time after the UE has had at least one UL E-DCH transmission. In case of stand-alone HS-DPCCH there may not be any UL data since the E-DCH resource is requested to aid the DL transmissions. Hence, this is opposite of the typical case when an E-DCH requested for the purpose of transmitting UL data.

The Tb and Ths-dpcch timers expiration times are configured by the network. The Tb timer's expiration time is given by the "EDCH transmission continuation back off" and the expiration time for the Ths-dpcch is given by "HS-DPCCH transmission continuation back off".

Preferably the Tb and Ths-dpcch timers are not run simultaneously. From the start the Ths-dpcch is used and once there is UL data, it is stopped and the Tb timer is used thereafter.

In order to accommodate a large number of users in CELL_FACH, the common E-DCH resources should not be kept longer than needed. This implies that the timer settings for Ths-dpcch and Tb should be as small as possible. In a possible cell configuration the Tb timer may be set to 0. This means that as soon as the UE has emptied its UL buffer, the E-DCH resource is released. This setting will be optimal to cater for UEs accessing the common E-DCH resource to transmit a short burst of UL data.

To aid DL HS-DSCH traffic the situation is different. The DL scheduling delay will cause jitter in the DL traffic and a larger timer setting is needed. As an example, a certain example product that can schedule up to 96 users (including CELL_DCH users), and with any reasonable scheduling algorithm it can be understood that there may be some time between the DL packets to any specific user. Also the CQI reports may be configured to be transmitted periodically on the HS-DPCCH which implicates that the resource should be kept long enough to allow for transmission of CQI reports.

The Tb timer takes over once there is UL data. This means that possibly two different timer settings will be used for the release of the E-DCH resource in the case of stand-alone HS-DPCCH. This also means that it will not be possible to have optimal system performance since optimization can occur either (1) for the UL data use case with a fast release (with bad consequences for the stand-alone HS-DPCCH) or (2) for the DL data case with a much slower release (with bad consequences for UL data use case).

A more severe problem is the fact that "E-DCH transmission continuation back off", which is used to configure the Tb timer, is given in transmission time intervals (TTIs). This means that a specific configured value will result in different timer settings (measured in ms) depending on whether the UE is using a 2 ms TTI E-DCH resource or a 10 ms TTI E-DCH resource. For example, the highest available "E-DCH transmission continuation back off" is 80 TTIs, i.e., 160 ms for 2 ms TTI resource or 800 ms for a 10 ms TTI resource. In the case of stand-alone HS-DPCCH, the Tb timer takes over after the Ths-dpcch timer once there has been an UL transmission. This means that the Tb timer is used to assist the DL HS-DSCH with ACK/NACK and CQI reports. Since the DL is unaffected by the choice of UL TTI, it is an undesirable situation to have the expiration time dependent on the TTI length of the UL E-DCH.

In case of Ths-dpcch, the optimal timer setting "HS-DPCCH transmission continuation back off" to assist DL HS-DSCH will be independent of the TTI length of the UL E-DCH. Once the Tb timer takes over, this is no longer possible to achieve.

SUMMARY

In one of its aspects the technology disclosed herein concerns a wireless terminal which is configured to communicate over a radio interface with a radio access network. The wireless terminal comprises a timer and a timer controller. The timer is configured to determine when to release an Enhanced Dedicated Channel (E-DCH) resource utilized on an uplink from the wireless terminal to the network. The timer controller is configured to initialize or adjust the timer with a timer value received from the network, the timer value being for a mode in which the network has commanded the wireless terminal to request a common E-DCH resource.

In an example embodiment the mode is a stand-alone HS-DPCCH mode, and the timer value is set as a maximum of "E-DCH transmission continuation back off" parameter and a "HS-DPCCH transmission continuation back off" parameter.

In an example embodiment and mode the wireless terminal comprises plural timers including a Tb timer and a Ths-dpcch timer, and the timer controller is configured to set the timer value of the Tb timer as either a value of the Ths-dpcch timer or a maximum of an existing value of the Tb timer and the value of the Ths-dpcch timer.

In an example embodiment and mode the timer is started after a synchronization AA period and at a time that the wireless terminal is allowed to start its E-DCH transmissions.

In an example embodiment and mode the timer value depends on either (1) traffic causing the timer to reset; and/or (2) current E-DCH load.

In an example embodiment and mode the wireless terminal further comprises a communications interface through which the timer value is received from the network in a system information block.

In an example embodiment and mode the wireless terminal further comprises a communications interface through which the timer value is received from the network in an HS-SCCH order signal.

In an example embodiment and mode the timer controller is configured: upon reception of a MAC-ehs PDU, to re-start the timer; to stop the timer upon receipt of data for uplink transmission; once the timer is stopped, to not start the timer for a duration of the E-DCH access; and wherein when the timer expires, the E-DCH is released.

In an example embodiment and mode the wireless terminal is configured to notify the network regarding release of the common E-DCH resources when either: (a) a Tbhs timer expires and the wireless terminal has no user data for uplink transmission in its buffer; or (b) both the Tbhs timer and a Tb timer are running but have expired. In an example implementation, the wireless terminal is configured to notify the network regarding the release of the common E-DCH resources by sending scheduling information with a TEBS index representing total E-DCH buffer status set equal to zero.

In an example embodiment and mode the wireless terminal is configured: (1) to start the timer after contention resolution and to send uplink data to the network after contention resolution if during contention resolution a TEBS index representing total E-DCH buffer status is greater than or less than zero; and (2) not to transmit scheduling information if the TEBS index representing the total E-DCH buffer status is greater than or less than zero before a synchronization AA procedure is terminated, but to transmit uplink data and HS-DPCCH after the synchronization AA procedure is terminated.

In an example embodiment and mode the wireless terminal is configured to ignore an order to initiate a stand-alone HS-DPCCH when a process of obtaining an E-DCH resource for the purpose of uplink transmission has begun but a synchronization AA procedure has not been completed.

In an example embodiment and mode, the timer value is selected from a set comprising at least one of 10 milliseconds, 20 milliseconds, 32 milliseconds, 40 milliseconds, 64 milliseconds, 80 milliseconds, 160 milliseconds, and 320 milliseconds. In an example implementation, the selected timer value is rounded up to a next E-DCH transmission time interval of an employed C-EDCH resource.

In another of its example aspects the technology disclosed herein concerns a node of a radio access network which is configured to communicate over a radio interface with a wireless terminal. The node comprises a signal generator and a communications interface. The signal generator is configured to generate a timer value for use by the wireless terminal in determining when to release an Enhanced Dedicated Channel (E-DCH) resource utilized on an uplink from the wireless terminal to the network. The timer value is for a mode in which the network has commanded the wireless terminal to request a common E-DCH resource. The communications interface is configured to transmit the timer value to the wireless terminal.

In an example embodiment the mode is a stand-alone HS-DPCCH mode, and wherein the timer value is set as a maximum of "E-DCH transmission continuation back off" parameter and a "HS-DPCCH transmission continuation back off" parameter.

In an example embodiment and mode the signal generator is configured to set a timer value for a first timer as either a value of a second timer or a maximum of an existing value of the first timer and the value of the second timer.

In an example embodiment and mode the timer value depends on either (1) traffic causing the timer to reset; and/or (2) current E-DCH load.

In an example embodiment and mode the timer value is transmitted to the wireless terminal through the communications interface in a system information block.

In an example embodiment and mode the timer value is transmitted to the wireless terminal through the communications interface in an HS-SCCH order signal.

In an example embodiment and mode, the signal generator of the node is configured to select the timer value from a set comprising at least one of 10 milliseconds, 20 milliseconds, 32 milliseconds, 40 milliseconds, 64 milliseconds, 80 milliseconds, 160 milliseconds, and 320 milliseconds. In an example implementation, the selected timer value is rounded up to a next E-DCH transmission time interval of an employed C-EDCH resource.

In another of its example aspects the technology disclosed herein concerns a method of operating a radio access network comprising a network node which is configured to communicate over a radio interface with a wireless terminal. The method comprises the network signaling a timer value to the wireless terminal for use in a mode wherein the network has commanded the wireless terminal to request a common E-DCH resource; and the wireless terminal initializing the timer with the timer value and, upon expiration of the timer, the wireless terminal releasing an Enhanced Dedicated Channel (E-DCH) resource utilized on an uplink from the wireless terminal to the network.

In an example embodiment the mode is a stand-alone HS-DPCCH mode, and the method further comprises setting the timer value as a maximum of "E-DCH transmission continuation back off" parameter and a "HS-DPCCH transmission continuation back off" parameter.

In an example embodiment and mode the wireless terminal comprises plural timers including a first timer and a second timer, and the method further comprises the timer controller setting the timer value of the first timer as either a value of the second timer or a maximum of an existing value of the first timer and the value of the second timer.

In an example embodiment and mode the method further comprises starting the timer after a synchronization AA period and at a time that the wireless terminal is allowed to start its E-DCH transmissions.

In an example embodiment and mode the method further comprises setting the timer value to depend on either (1) traffic causing the timer to reset; and/or (2) current E-DCH load.

In an example embodiment and mode the method further comprises transmitting the timer value from the network to the wireless terminal in a system information block.

In an example embodiment and mode the method further comprises transmitting the timer value from the network to the wireless terminal in an HS-SCCH order signal.

In an example embodiment and mode the method further comprises: upon reception of a MAC-ehs PDU, re-starting the timer; stopping the timer upon receipt of data for uplink transmission; once the timer is stopped, not starting the timer for a duration of the E-DCH access; and when the timer expires, releasing the E-DCH.

In an example embodiment and mode, the method further comprises notifying the network regarding release of the common E-DCH resources when either: (a) a Tbhs timer expires and the wireless terminal has no user data for uplink transmission in its buffer; or (b) both the Tbhs timer and a Tb timer are running but have expired. In an example implementation, notifying the network regarding the release of the common E-DCH resources comprises sending scheduling information with a TEBS index representing total E-DCH buffer status set equal to zero.

In an example embodiment and mode the method further comprises: staring the timer after contention resolution and sending uplink data to the network after contention resolution if during contention resolution a TEBS index representing total E-DCH buffer status is greater than or less than zero; and not transmitting scheduling information if the TEBS index representing the total E-DCH buffer status is greater than or less than zero before a synchronization AA procedure is terminated, but transmitting uplink data and HS-DPCCH after the synchronization AA procedure is terminated.

In an example embodiment and mode, the method further comprises selecting the timer value from a set comprising at least one of 10 milliseconds, 20 milliseconds, 32 milliseconds, 40 milliseconds, 64 milliseconds, 80 milliseconds, 160 milliseconds, and 320 milliseconds. In an example implementation, the method further comprises rounding up the selected timer value to a next E-DCH transmission time interval of an employed C-EDCH resource.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

DETAILED DESCRIPTION

Figure 1:
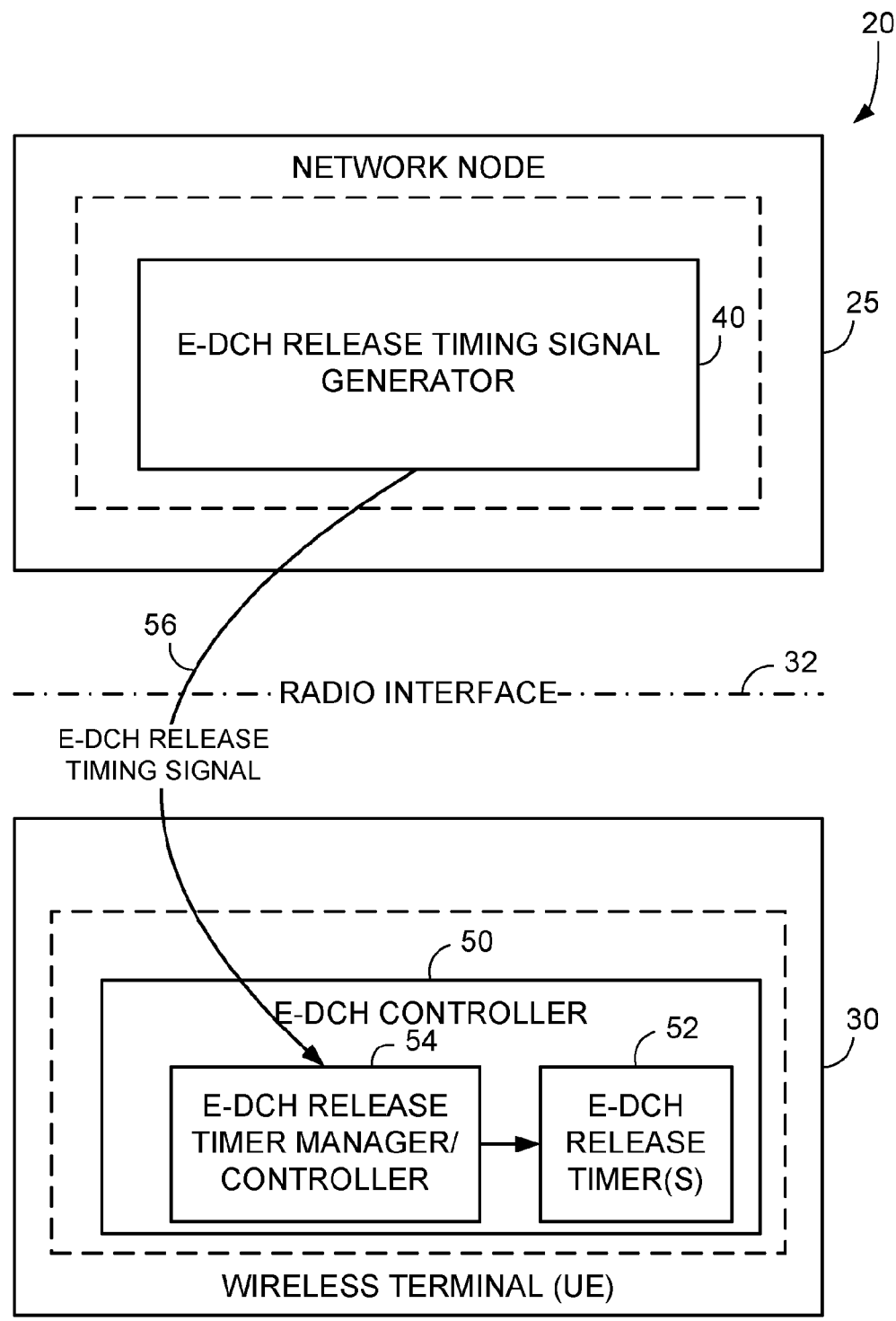
FIG. 1 is a schematic view of example embodiment of a radio communications network comprising a network node which generates an E-DCH release timing signal and a wireless terminal which operates one or more E-DCH release timers according to an example embodiment.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The following terminologies may be used in the disclosure for consistency and simplicity. The technology described herein may apply to a heterogeneous network comprising network As used herein, the term "node" may encompass nodes using any technology including, e.g., high speed packet access (HSPA), long term evolution (LTE), code division multiple access (CDMA)2000, GSM, etc. or a mixture of technologies such as with a multi-standard radio (MSR) node (e.g., LTE/HSPA, GSM/HS/LTE, CDMA2000/LTE etc). Furthermore the technology described herein may apply to different types of nodes e.g., base station, eNode B, Node B, relay, base transceiver station (BTS), donor node serving a relay node (e.g., donor base station, donor Node B, donor eNB), supporting one or more radio access technologies.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

FIG. 1 shows an example radio communications network 20 comprising a network node 25 and a wireless terminal (UE) 30. In any embodiment described herein the wireless terminal may be called by other names and comprise different types of equipment. For example, the wireless terminal may also be called a mobile station, wireless station, or user equipment (UE), and may be equipment such as a mobile telephone ("cellular" telephone) and a laptop with mobile termination, and thus may be, for example, portable, pocket, hand-held, computer-included, or car-mounted mobile devices which communicate voice and/or data with radio access network.

Figure 2:
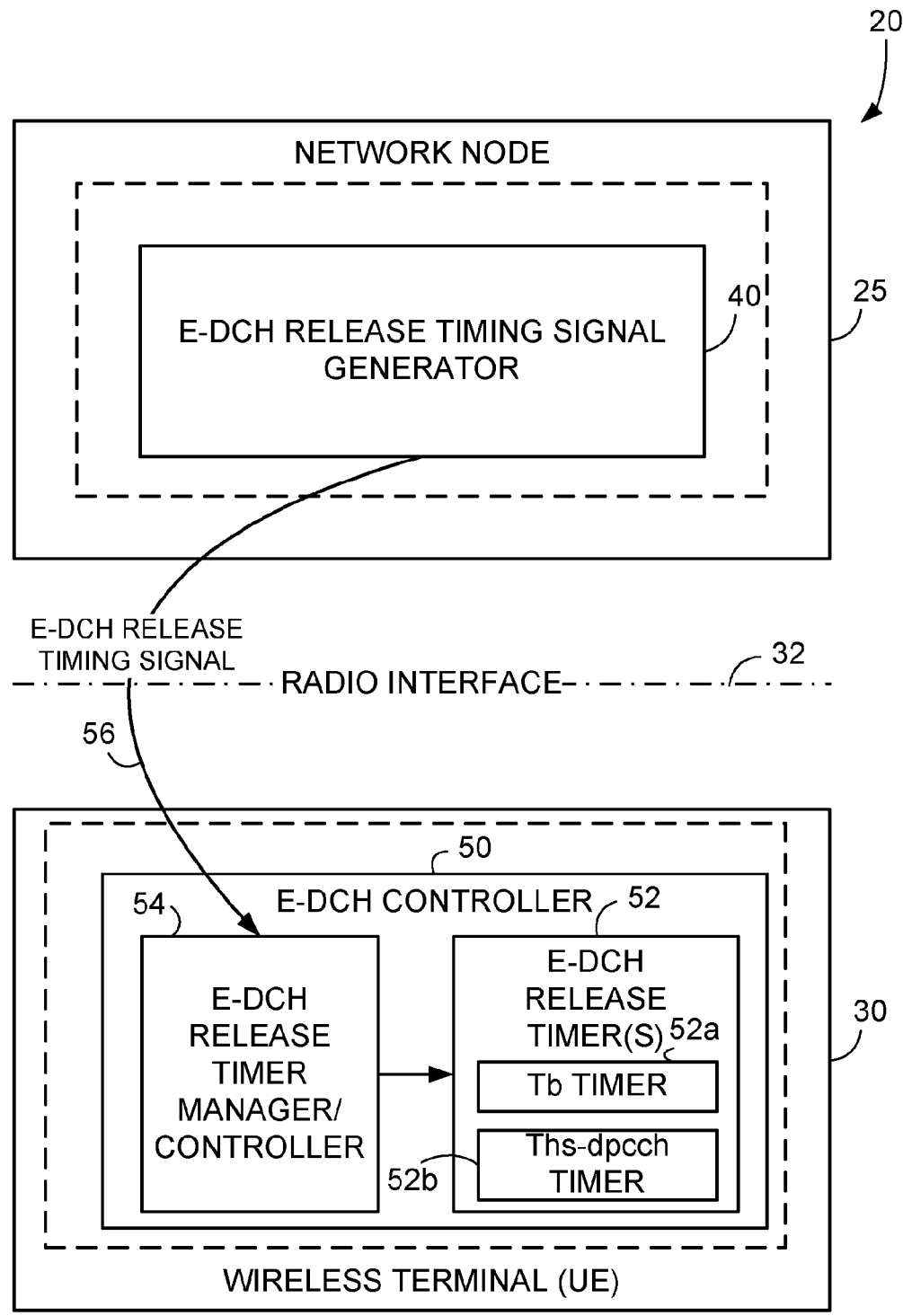
FIG. 2 is a schematic view of an example implementation of the radio communications network of FIG. 1 and further showing plural E-DCH release timers according to an example embodiment.

The network node 25 and the wireless terminal 30 communicate over a radio or air interface 32 which is depicted by a dotted-dashed line in FIG. 2. In a basic generic embodiment, the network node 25 comprises an E-DCH release timing signal generator 40 which generates an E-DCH release timing signal. The wireless terminal 30 comprises an E-DCH controller 50 which in turn comprises one or more E-DCH release timers 52 and an E-DCH release timer controller or manager 54. The timer(s) 52 is/are configured to determine when to release an Enhanced Dedicated Channel (E-DCH) resource utilized on an uplink from the wireless terminal 30 to the network, e.g., to release the E-DCH when the timer(s) 52 expires. The timer controller 54 is configured to initialize the timer(s) 52 with a timer initialization value received in the E-DCH release timing signal from the network and to start the timer. The timer initialization values and the time or phenomena which start the timer(s) are specified below for the respective embodiments.

In an example embodiment and mode, the E-DCH release timing signal generator is configured to generate a timer value which is unique for the stand-alone HS-DPCCH mode, as opposed to other E-DCH modes.

FIG. 2 illustrates an example embodiment wherein the E-DCH release timers 52 comprise one or both of a Tb timer 52a and a Ths-dpcch timer 52b.

The technology disclosed herein serves, e.g., to adjust the expiration timer setting for the one or more E-DCH release timers 52 (e.g., the Tb timer 52a) in the case that the common-E-DCH is established for the purpose of stand-alone HS-DPCCH. This means, for example, that the "EDCH transmission continuation back off" which is transmitted (e.g., broadcasted in some cases) to give the expiration time of Tb is altered in this case. The adjustment can be done either through a standardized formula, or preferably signaled to the wireless terminal (UE).

In accordance with example embodiments of the technology disclosed herein it is also possible to use separate UL and DL timers to control the release of the common E-DCH resource.

If the E-DCH is instead established to transmit UL data, the "EDCH transmission continuation back off" is used according to legacy specification, i.e., to set the expiration time of the Tb timer 52a. The adjustment can be done either through a standardized formula, or preferably signaled to the wireless terminal (e.g., UE).

Several different embodiments of the technology disclosed herein are described, including example embodiments which illustrate how the adjustment values for the expiration time of the Tb timer 52a may be adjusted (e.g., by formula) and example embodiments of how such adjustment values for the expiration time of the Tb timer 52a may be transmitted or signaled to the wireless terminal 30. In addition, some example embodiments of the technology disclosed herein illustrate how to derive reasonable settings of the timer Ths-dpcch.

As used in some but not necessarily all example embodiments herein, the expiration time of timer Tb as signaled by the network may be denoted as Tb*, and the expiration time of the timer Ths-dpcch as signaled by the network may be denoted as Ths-dpcch*.

Since the Tb is typically set to minimize the resource occupation of UL users, the value is typically small. For the Ths-dpcch, the value is typically larger to account for jitter in the DL transmissions and the periodicity of the CQI reports. To still account for jitter in the DL transmissions and periodicity of the CQI reports when the Tb takes over from Ths-dpcch after the first UL transmission, the Tb expiration time should typically be increased. This can be done by altering Tb* to give a new setting Tb_adj* according to either of Expression 1 or Expression 2.

$$Tb\_adj^* = Ths\text{-}dpcch^* \qquad \text{Expression 1}$$

$$Tb\_adj^* = \max(Tb^*, Ths\text{-}dpcch^*) \qquad \text{Expression 2}$$

These adjustments are only valid when the establishment of the E-DCH is done for the purpose of using stand-alone HS-DPCCH.

In another example embodiment the expiration value depends on the traffic causing the timer to reset. In this case, only one timer, T_cedch is needed. The expiration time of this one timer is initially set to Ths-dpcch* if the EDCH is DL triggered or to Tb* if the E-DCH is UL triggered. The DL triggered is what has been defined as HS-DPCCH stand-alone (nodeB triggered HSDPCCH in the standard) that is triggered by a HSSCCH order. UL triggered is caused by the UE having data in the UL buffer. Then the following four actions may apply:
1: On UL activity, reset T_cedch*=max(T_cedch*,Tb*)
2: On DL activity, reset T_cedch*=max(T_cedch*,Ths-dpcch*)
3: Otherwise, decrement T_cedch after each TTI without UL and DL activity.
4: Trigger implicit release when T_cedch equals to 0.

Figure 8:
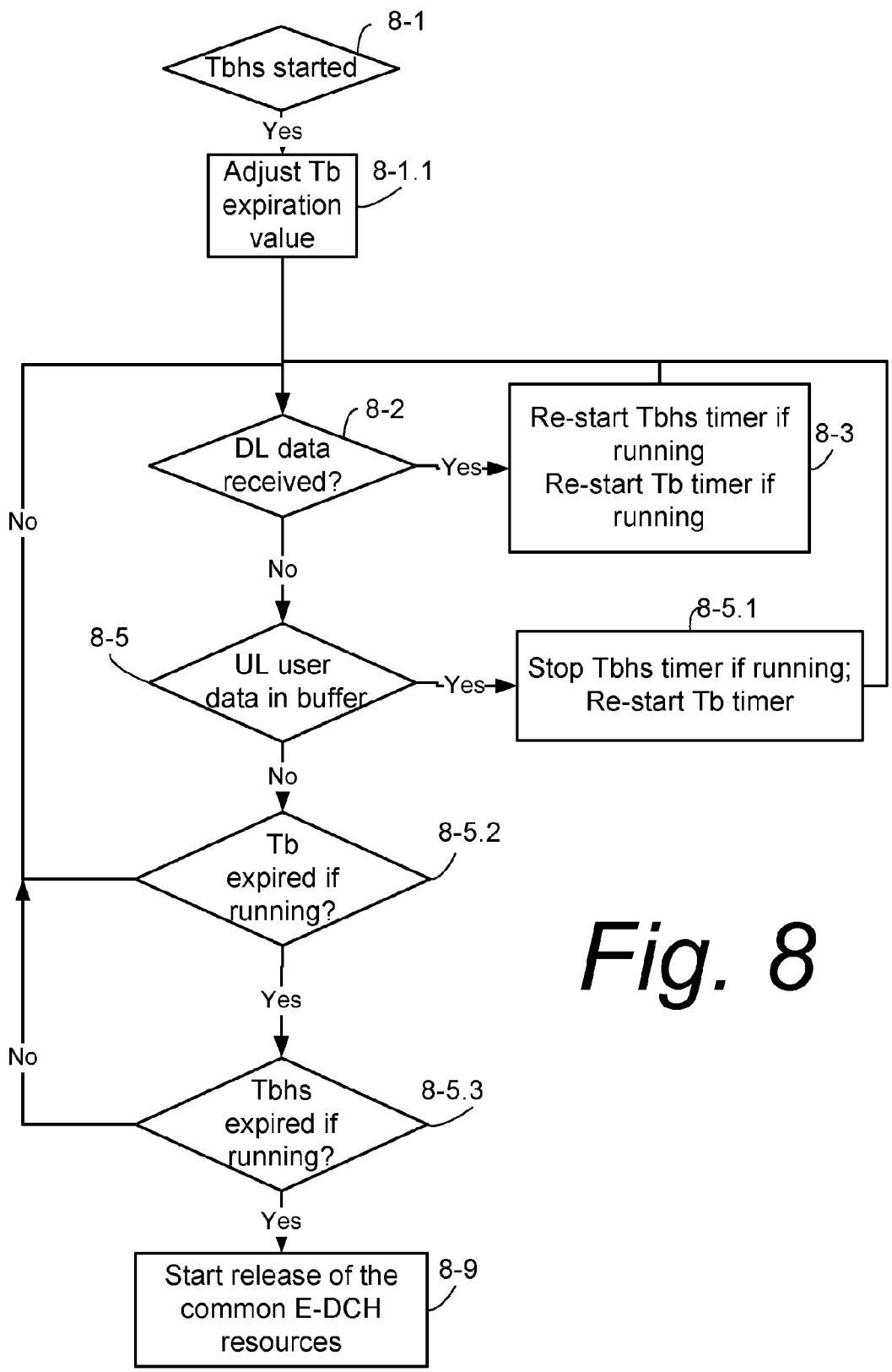
FIG. 8 is a flowchart showing example basic acts or steps comprising an example embodiment and mode of the technology disclosed herein.

Another option, indeed another example embodiment illustrated by way of example in FIG. 8, involves resetting the Ths-dpcch (or another timer such as a new timer Tbhs) to only react on DL data and to not stop the Ths-dpcch upon UL data transmissions. Then both timers could be run simultaneously and the resources released upon expiration of any of the timers (Tb or Ths-dpcch) as long as the other is not running and the wireless terminal does not have any user data in its buffer. A timer which is not running has either expired, is not configured or it was not started.

FIG. 8 thus illustrates example acts or steps which comprise an example embodiment or mode of the technology disclosed herein. FIG. 8 particularly illustrates example acts or steps involved in operating a wireless terminal (e.g., of operating an E-DCH controller) in accordance with the foregoing. Act 8-1 of FIG. 8 depicts determining whether the Tbhs timer has been started. In FIG. 8, the Tbhs timer notation encompasses or comprises the new timer Tbhs timer mentioned above. When the Tbhs timer has been started, as act 8-1.1 the expiration value of timer Tb is adjusted, in any manner as described above. Then, as act 8-2, the wireless terminal checks whether downlink (DL) data has been received. If downlink (DL) data has been received, as reflected by act 8-3 the Tbhs timer is restarted if running and the Tb timer is restarted if running After resetting of either or both of the running timers, a further check for receipt of downlink (DL) is performed (act 8-2). If downlink (DL) data has not been received, as act 7-5 a determination is made whether there is uplink (UL) user data in the buffer of the wireless terminal. If there is uplink (UL) user data in the buffer of the wireless terminal, as act 8-5.1 the Tbhs timer is stopped if running and the timer Tb is restarted. If there is no uplink (UL) user data in the buffer, as act 8-5.2 a check is made to determine if the timer Tb has expired if the timer Tb is running. If the timer Tb has not expired, execution loops back to act 8-2. But if the timer Tb has expired after running, as act 8-5.3 a check is made whether the timer Tbhs has expired after running. If the check of act 8-5.3 is negative, execution loops back to act 8-2. If the timer Tbhs has expired after running, release of the common E-DCH resources begins as act 8-9.

In a case such as FIG. 8 in which the timers can run simultaneously, the Ths-dpcch/Tbhs timer could be started using the HS-SCCH order to initiate the stand-alone HS-DPCCH, even when the E-DCH was UL triggered (the HS-SCCH order is received when the wireless terminal is already accessing to obtain an E-DCH resource for UL transmissions.

In FIG. 8 the Tbhs timer only reacts (restarts) on downlink (DL) data, while Tb timer reacts (restarts) on both uplink (UL) and downlink (DL) data. In the FIG. 8 example embodiment the Tbhs and Tb timers may have different expiration values and may run simultaneously. In other cases including a situation previously described, the Tbhs timer is stopped when there is UL data and the Tb is started with an adjusted expiration value (compared to what is used with an UL triggered E-DCH, e.g. max of the expiration timers of Tb and Tbhs). Since the Tbhs only reacts on DL data, the Tb is needed in case there are UL transmissions. In at least some example embodiments Ths-dpcch and Tbhs may refer to the same timer, or Tbhs may be a new timer.

Figure 3:
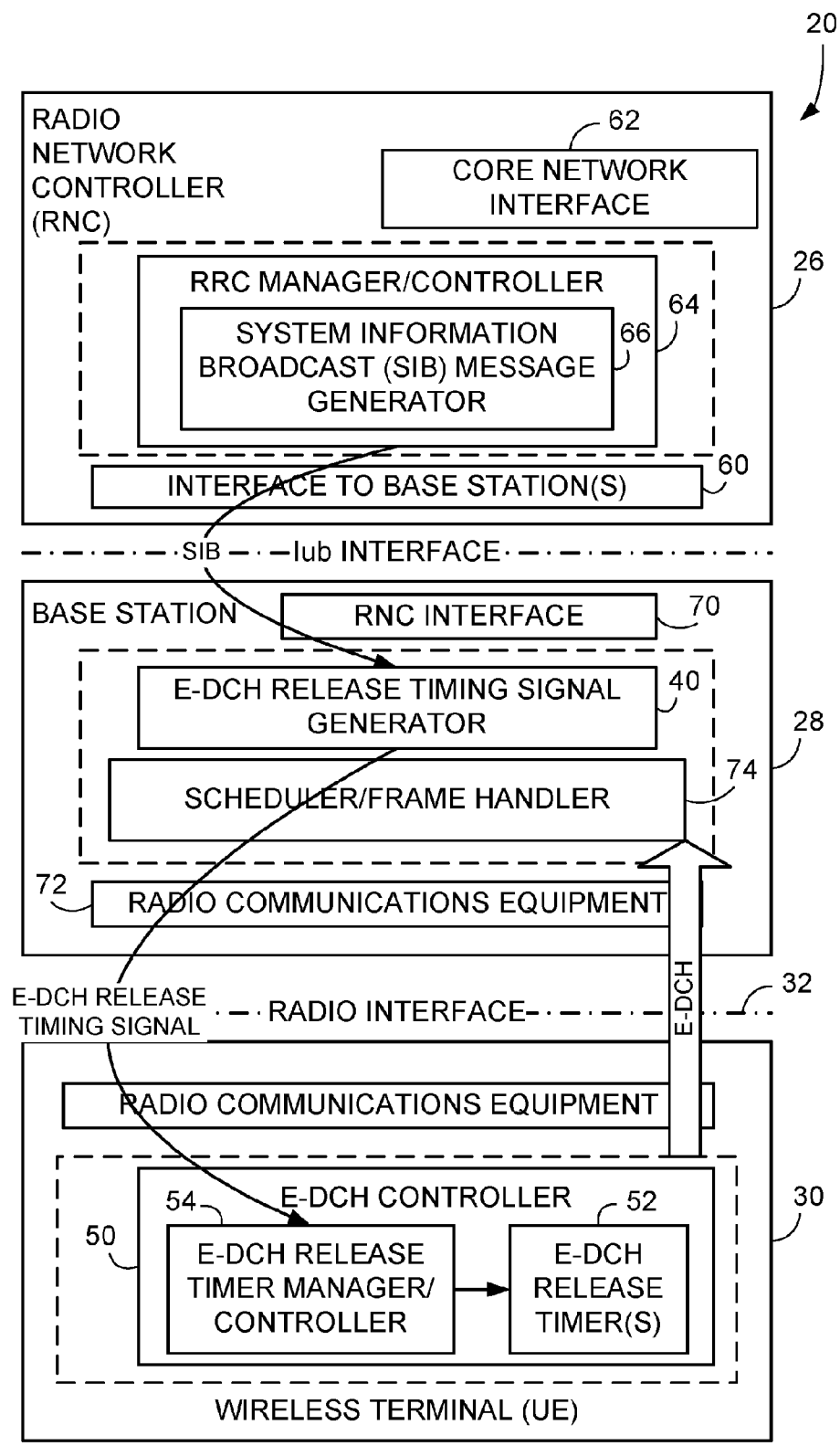
FIG. 3 is a schematic view of another example embodiment of a radio communications network comprising a network node which generates an E-DCH release timing signal by using System Information Block (SIB) information obtained from a radio network controller (RNC) node.

In one example embodiment the Tb* value for stand-alone HS-DPCCH is signaled to the wireless terminal 30 by sending the Tb* value in the system information block (SIB). In this case it is known to and the same for all wireless terminals. FIG. 3 illustrates an example such example embodiment wherein the radio access network comprises a base station node 28 and a radio network controller (RNC) 26. In the embodiment of FIG. 3 the radio network controller (RNC) node 26 comprises an interface 60 to base station node(s) as well as an interface 62 to an unillustrated core network(s). The radio network controller (RNC) 26 of FIG. 3 further comprise a Radio Resource Management unit or controller 64, which in turn may comprise a System Information Block (SIB) message generator 66. The System Information Block (SIB) message generator generates 66 or otherwise causes transmission of the System Information Block (SIB) to the base station node 28 over an interface known as the Iub interface. It will be appreciated that the radio network controller (RNC) node 26 comprises other functionalities and units, such as functionalities involved in resource control or allocation, diversity handling, handoff control, etc.

By way of example the base station node 28 comprises an interface 70 to the RNC node 28 as well as radio communications interface 72 by which the base station node communicates over the radio interface with the wireless terminal 30. It is thus understood that the base station node 28 comprises radio transmitters and receivers as well as units which prepare transmission of data to the wireless terminal 30 (e.g., buffers, encoders, modulators, amplifiers) and units which process data received from the wireless terminal (e.g., decoders, demodulators, buffers). FIG. 3 shows the base station node 28 as comprising the E-DCH release timing signal generator 40 as well as scheduler/frame handler 74. Those skilled in the art appreciate that the base station node 28 also comprises other functionalities and units.

In the example embodiment shown in FIG. 3, the base station node 28 receives the System Information Block (SIB) from the radio network controller (RNC) node 26 and uses the SIB for preparation/or and generation of the E-DCH release timing signal, e.g., includes in the E-DCH release timing signal appropriate information from the System Information Block (SIB).

Figure 4:
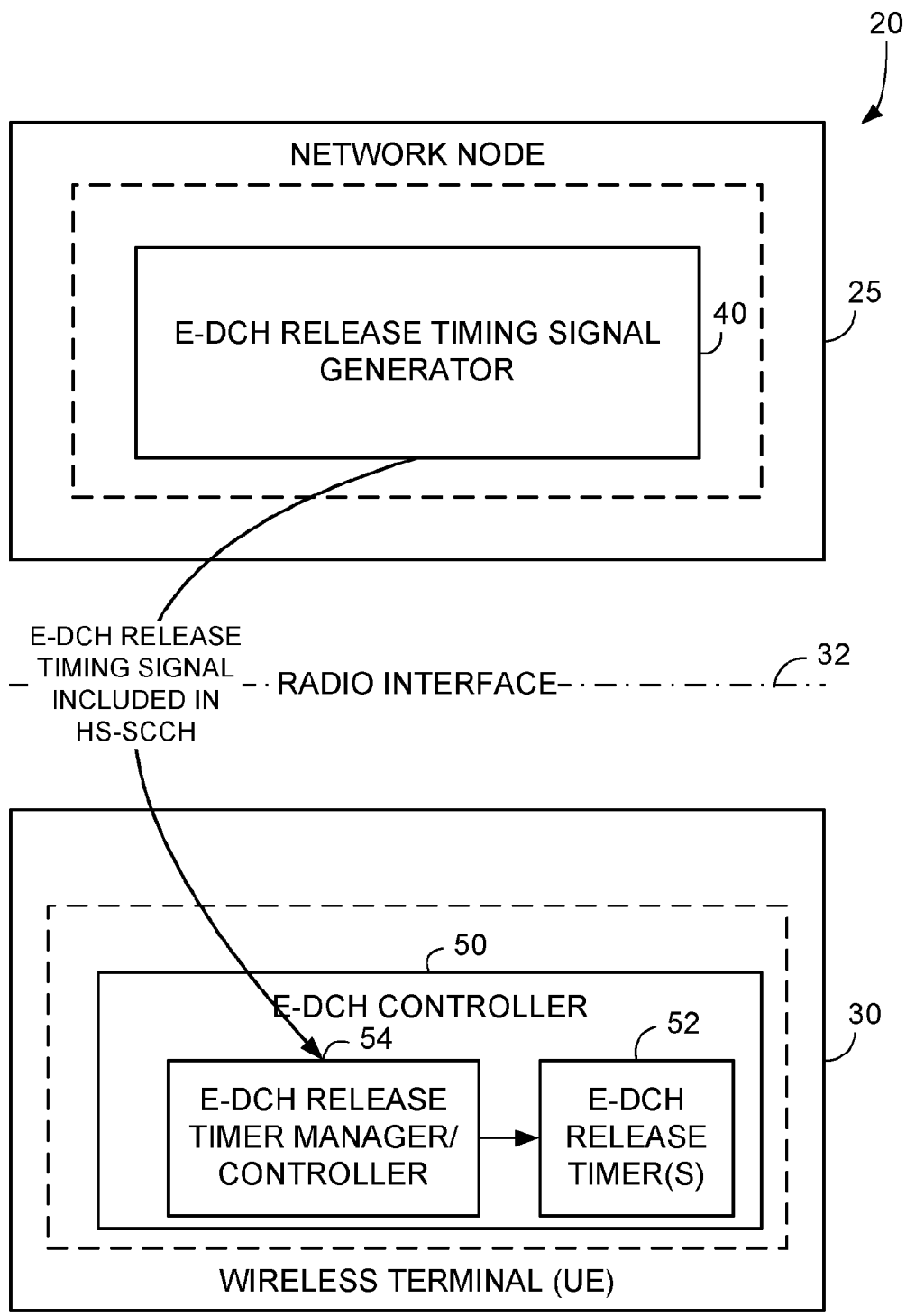
FIG. 4 is a schematic view of another example embodiment of a radio communications network comprising a network node which generates and sends a timer adjustment value using HS-SCCH signaling.

Since in an example embodiment and mode the establishment of the stand-alone HS-DPCCH starts with an HS-SCCH order, in another example embodiment the HS-SCCH is also employed to signal the expiration time of the Tb timer 52a for the current stand-alone HS-DPCCH, in a manner illustrated by way of example in FIG. 4.

One possibility is to also send the adjusted Tb setting in the same order that initiates the establishment of the stand-alone HS-DPCCH. In this way the wireless terminal gets the value as it starts the process of establishing the stand alone HS-DPCCH. The value would further only be valid for the current stand alone HS-DPCCH.

Signaling the Tb (and Ths-dpcch) setting using a HS-SCCH order makes it possible to fine tune the setting based on the current E-DCH load. At times with low load the Tb could be set to a high (or optimal in a DL sense) value. On the other hand, if there is a high load, the value could be set lower than optimal, in order not to create unnecessary blocking when new wireless terminals try to get E-DCH resources.

Whereas in some example embodiments and modes the signal expiration time(s) are sent in a same HS-SCCH order that initiates the establishment of the stand-alone HS-DPCCH, in another example embodiment a separate order is sent to signal expiration times of both the Tb and the Ths-dpcch.

The possible settings of the Ths-dpcch given by "HS-DPCCH transmission continuation back off", should take into account the possible values of the "E-DCH transmission continuation back off", which are used to configure the Tb timer 52a.

The HS-SCCH transmission continuation backoff is a configuration value, selected from several possible values. In an example embodiment the HS-SCCH transmission continuation backoff value is sent from the network to a particular wireless terminal, and in so doing the network may chose and send an appropriate HS-SCCH transmission continuation backoff value individually for each wireless terminal instead of sending a general value for all wireless terminals as would be done in the case of a broadcast. This example embodiment optimizes the timer value for each wireless terminal. The possible Ths-dpcch settings should take into account the currently configured CQI Feedback cycles for E-DCH in CELL_FACH. The possible values given by the information element (IE) "CQI Feedback cycle" belong to the set [0, 2, 4, 8, 10, 16, 20, 32, 40, 64, 80, 160] ms. Some possible values can be derived from this CQI cycles that are also reasonable in terms or DL scheduling jitter and retention of the C-EDCH resource, for example [10, 20, 32, 40, 64, 80, 160, 320] ms.

Another option, e.g., another example embodiment, comprises having the reset of the Ths-dpcch only react on downlink (DL) data and to not stop the Ths-dpcch upon uplink (UL) data transmissions. Then both timers may be run simultaneously and the resources released upon expiration of any of the timers (Tb or Ths-dpcch) as long as the other is not running and the wireless terminal does not have user data to be transmitted. A timer which is not running has either expired, or is not configured, or was not started. In this case (when the timers can run simultaneously), the Ths-dpcch timer 52b could be started upon reception of a HS-SCCH when the wireless terminal already has a C-EDCH resource (the HS-SCCH order is received when the wireless terminal is already accessing to obtain an E-DCH resource for UL transmissions). C-EDCH means common E-DCH that is only used for CELL FACH.

Various example embodiments and modes described herein allow, e.g., the network to optimize the timer settings for both wireless terminals that are accessing common E-DCH in order to send UL data and for wireless terminals who access the common E-DCH for the purpose of stand-alone HS-DPCCH simultaneously. Without this feature there may be potentially high blocking due to that resources are kept longer than needed for UL transmissions or, the HS-DSCH will not be able to fully utilize the benefit from using the stand-alone HS-DPCCH. Depending on which embodiment is used, the solutions either provide minimal overhead or a highly dynamic resource control.

In other example embodiments the E-DCH release timer may comprise a timer (Tbhs) which is independent of the legacy Tb timer. The implementation and use of such timer (Tbhs) may be consistent with one or more of the following factors:

The new timer controls the release of the common E-DCH resources when the wireless terminal transmits only HS-DPCCH+DPCCH (e.g., stand-alone HS-DPCCH).

This new timer will be optional and configurable by the network.

For DL triggered HS-DPCCH, the new timer is started when the DPCCH transmission starts.

For DL triggered HS-DPCCH, when DL data is received, the wireless terminal resets and restarts the new timer.

For DL triggered HS-DPCCH, when UL data on the/DCCH is to be transmitted and/or detected at the wireless terminal, the new timer is stopped and the wireless terminal follows legacy E-DCH behavior thereon.

Once this new timer is stopped, it is not started anymore during that access (for as long as the wireless terminal has the common E-DCH resource).

The timer Tbhs may be generically represented by the E-DCH release timer of FIG. 1, for example. Concerning the timer Tbhs, in some example embodiments when Node B has DL data, the Node B sends a HS-SCCH order to request a stand-alone HS-DPCCH from the wireless terminal. Upon reception, the wireless terminal chooses the random access signature/PRACH code number and executes the existing PRACH preamble ramping procedure to obtain common E-DCH resource. The procedure for starting, resetting/re-starting and stopping of the Tbhs timer comprises the following:

When the DPCCH transmission starts, the new timer Tbhs is started.

If a MAC-ehs PDU is received, the Tbhs is re-started.

If Tbhs expires, the wireless terminal releases the common E-DCH resources.

If wireless terminal gets UL data on DTCH/TCCH, the Tbhs is stopped and not started anymore in that access.

Reception and Transmission of Downlink/Uplink Data

According to 3GPP TS 25.321, the definition of DL data used to reset Tb refers to the reception of MAC-ehs PDU, meanwhile UL data means that TEBS < > 0 (being greater than or less than, but not zero) is detected. "TEBS" is an index representing the Total E-DCH buffer status, and is typically expressed as five bits. The same procedure can be used for the Tbhs timer as well. This will allow the wireless terminal a similar handling of this timer as for the Tb timer 52a.

In an example embodiment and mode of the technology disclosed herein, the definition of DL data to reset the new timer (Tbhs) is the reception of MAC-ehs PDU.

Start of the New HS-DPCCH Stand-Alone Timer

The time between for starting the transmission of DPCCH and the when the E-DPDCH/E-DPCCH/HS-DPCCH (AA synchronization time) have a different values for E-DCH 2 ms TTI and for 10 ms TTI. If the TTI length is 10 ms, then for (1+"Additional E-DCH transmission back off")*TTIs only DPCCH transmission takes place. If TTI length is 2 ms, then for (2+"Additional E-DCH transmission back off") TTIs only DPCCH transmission takes place. The "Additional E-DCH transmission back off" is a network configured value and it is part of the synchronization AA procedure which basically tells when the procedure starts. Therefore, the variation of the time, up to the starting of the HS-DPCCH transmission will depend on the TTI of the deployed common resource. This fact adds complexity to the selection of a suitable value for the new DL implicit release Tbhs timer given the fact that this value should fit to both 10 and 2 ms TTI. In order words, the time the wireless terminal would be transmitting the HS-DPCCH would be different if the wireless terminal chooses 2 ms TTI or 10 ms TTI because of the synchronization AA period.

Figure 5:
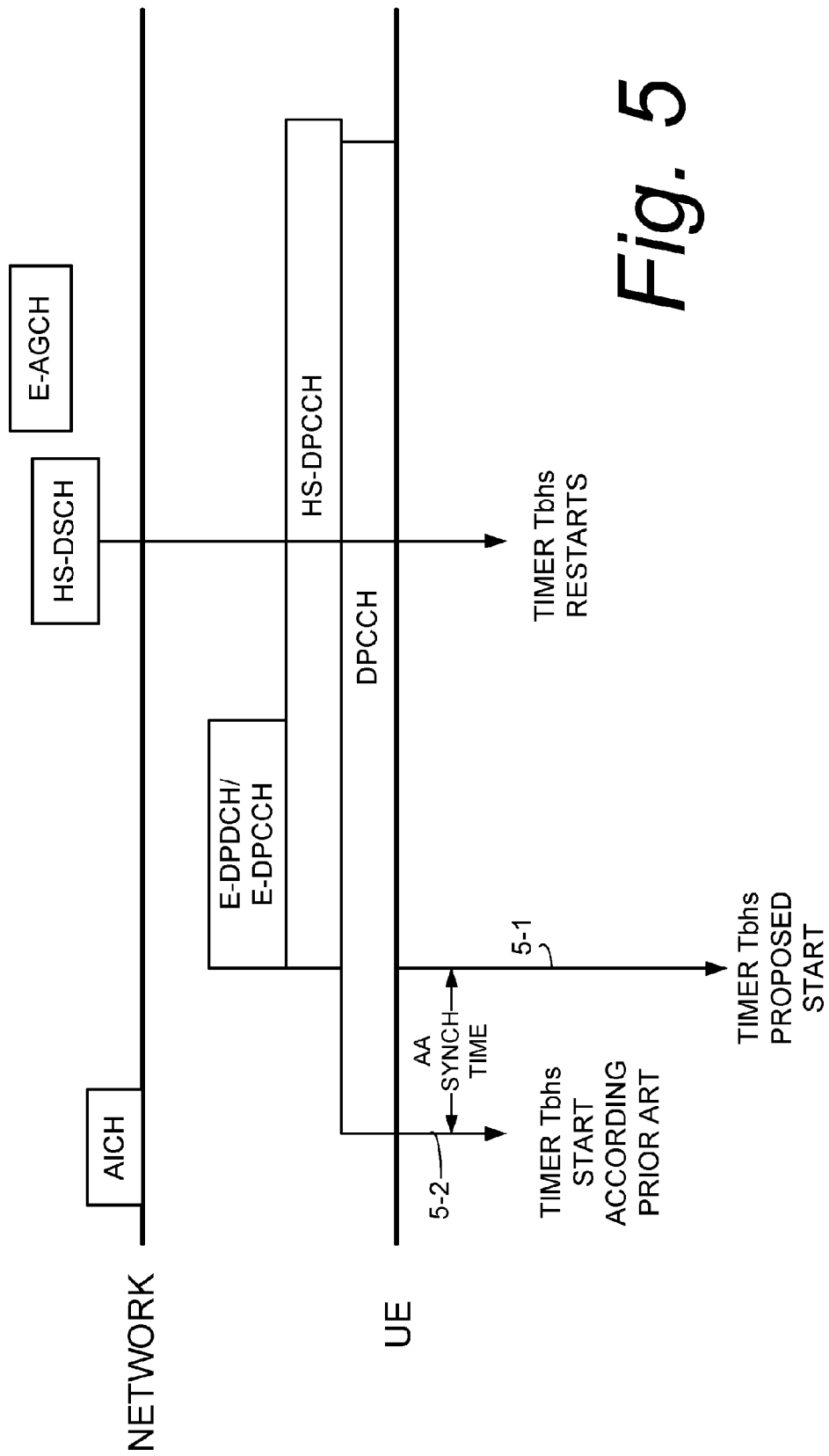
FIG. 5 is a schematic drawing illustrating starting of a Tbhs timer according to an example embodiment and mode.

A better approach is to start the Tbhs timer after the synchronization AA period, i.e., at the time the wireless terminal is allowed to start its E-DCH transmissions. Since the network has knowledge of when the HS-DPCCH transmission starts, the length of the Tbhs would be equal for both 2 ms and 10 ms. This simplifies the timer setting as the network can optimize the value which is suitable for both TTIs (see FIG. 5). FIG. 5 shows by arrow 5-1 the start the Tbhs timer after the synchronization AA period, which is in contrast to the prior art technique of starting a timer before the synchronization AA period (depicted by arrow 5-2).

Additionally, a timer setting that takes in account the initial variation of the AA synchronization time will be too long when the timer is reset after receiving HS-DSCH data, since the AA synchronization is only done initially.

Thus, in an example embodiment and mode of the technology disclosed herein, for DL triggered HS-DPCCH, the new Tbhs timer is started after the AA synchronization is completed.

Implicit Release Timers Interaction: UL Triggered (Tb) and DL Triggered (Tbhs)

The "E-DCH transmission continuation back off", which is used to configure the Tb timer 52a is given in TTIs. This means that a specific configured value will result in different timer settings (measured in ms) depending on whether the wireless terminal is using a 2 ms TTI E-DCH resource or a 10 ms TTI E-DCH resource. For example, the highest available "E-DCH transmission continuation back off", is 80 TTIs, i.e., 160 ms for 2 ms TTI resource or 800 ms for a 10 ms TTI resource. In the case of stand-alone HS-DPCCH, the Tb timer 52a takes over after the Tbhs timer once there has been an UL transmission. Since the DL is unaffected by the choice of UL TTI, it is an undesirable situation to have the expiration time dependent on the TTI length of the UL E-DCH.

In case of Tbhs, the optimal timer setting "HS-DPCCH transmission continuation back off" to assist DL HS-DSCH will be independent of the TTI length of the UL E-DCH. Once the Tb timer 52a takes over, this is no longer possible to achieve.

Once the Tb timer 52a takes over, the release of the common E-DCH resources will be triggered upon the expiration of Tb timer 52a. The network, though, may configure very short Tb timer 52a values which may not really be able to cope with DL jitter in high load situations. However, Tbhs may be configured to account for this jitter and may also take into account other network factors.

This problem can be solved in different ways. Below four possible non-limiting example options are provided:

Option 1: The Tb setting to be used for stand-alone HS-DPCCH is signalled through a HS-SCCH order. This could be done either by using the HS-SCCH order that initiates the stand alone HS-DPCCH or an independent HS-SCCH order.

Option 2: Adjust the Tb timer setting (Tb_setting) for stand-alone HS-DPCCH as Tb_setting=max ("E-DCH transmission continuation back off", "HS-DPCCH transmission continuation back off"). The "E-DCH transmission continuation back off" and "HS-DPCCH transmission continuation back off" are provided or known to the wireless terminal either by, e.g., broadcast messages or are signaled using RRC protocol.

Option 3: Keep one single inactivity timer Tcedch, with expiration time initially set to Tcedch_setting="HS-DPCCH transmission continuation back off" in the case of stand-alone HS-DPCCH and Tcedch_setting="E-DCH transmission continuation back off" in the case of UL triggered E-DCH.

Option 3.1: On UL activity, reset Tcedch_setting=max (Tcedch_setting, "E-DCH transmission continuation back off").

Option 3.2: On DL activity, reset Tcedch_setting=max (Tcedch_setting, "HS-DPCCH transmission continuation back off").

Option 4: Do not stop the Tbhs timer upon TEBS < > 0 is detected, and release the resources upon expiration of any of the timers (Tb or Tbhs) as long as the other is not running. A timer which is not running has either expired, is not configured or it was not started.

All of the foregoing alternatives have merits. Option 1 gives a great deal of flexibility but requires more signalling and definition of new HS-SCCH orders. Option 2 makes it possible to increase the Tb timer 52a setting if it is less than what is used for Tbhs, if longer then there is not really any difference. Option 3 adds additional possibilities to also adjust if the Tb timer 52a setting is larger than the Tbhs setting taking in account the elapsed time, but it has some impact on the wireless terminal complexity. Option 4, would allow having the Tbhs timer running at the same time as the Tb and the release of the resources is based on both the UL and DL traffic. With option 4, the starting of Tbhs (if configured) can be bound to the reception of the HS-SCCH order. In case the order is not received, Tbhs is not started and only the legacy Tb would govern the release. This option is clearly preferable in terms of signalling, simplicity, impact on legacy and flexibility.

According to an example embodiment and mode, the Tbhs timer is not stopped if TEBS < > 0 is detected.

When the Tbhs expires, typically, the wireless terminal will release the common E-DCH resources. To inform to the network about the release, the wireless terminal should follow a similar procedure as for CCCH transmissions, i.e., the wireless terminal should send the scheduling information (SI) with TEBS set to 0.

The wireless terminal, however, should not send the SI with TEBS set to 0 while the wireless terminal has data in the buffer even if the Tbhs timer has expired. It could happen that Tbhs and Tb are running at the same time. In this situation, the wireless terminal should send the SI with TEBS set to zero when the last timer expires.

In an example embodiment and mode of the technology disclosed herein, the scheduling information (SI) with TEBS equal to zero should be sent when: a) Tbhs timer expires and the wireless terminal has no data in its buffer; b) In case Tb and Tbhs timer are running, when both timers have expired.

Configurable Values for Tbhs

Presented above are some reasons for the difficulties to chose the configuration values of Tbhs due to the agreement on the starting of the timer and the differences between the period of DPCCH only transmissions between E-DCH 10 ms and 2 ms TTI. The possible settings of the Tbhs given by "HS-DPCCH transmission continuation back off", should take into account the possible values of the "E-DCH transmission continuation back off", which are used to configure the Tb timer 52a. The possible Tbhs settings could take into account the currently configured CQI Feedback cycles for E-DCH in CELL_FACH. The possible values are given by the IE "CQI Feedback cycle" given by [0, 2, 4, 8, 10, 16, 20, 32, 40, 64, 80, 160] ms. Some possible values can be derived from this CQI cycles that are also reasonable in terms or DL scheduling jitter and retention of the C-EDCH resource, for example [10, 20, 32, 40, 64, 80, 160, 320] ms.

The timer setting should also take into account that the E-DCH resource can be configured with either 2 ms or 10 ms TTI. This means that the timer setting should be rounded up to the next E-DCH TTI.

In an example embodiment and mode of the technology disclosed herein, the configurable values for the timer settings of Tbhs, "HS-DPCCH transmission continuation back off" are [10, 20, 32, 40, 64, 80, 160, 320] ms and they are rounded up to the next E-DCH TTI of the C-EDCH resource deployed.

Figure 6:
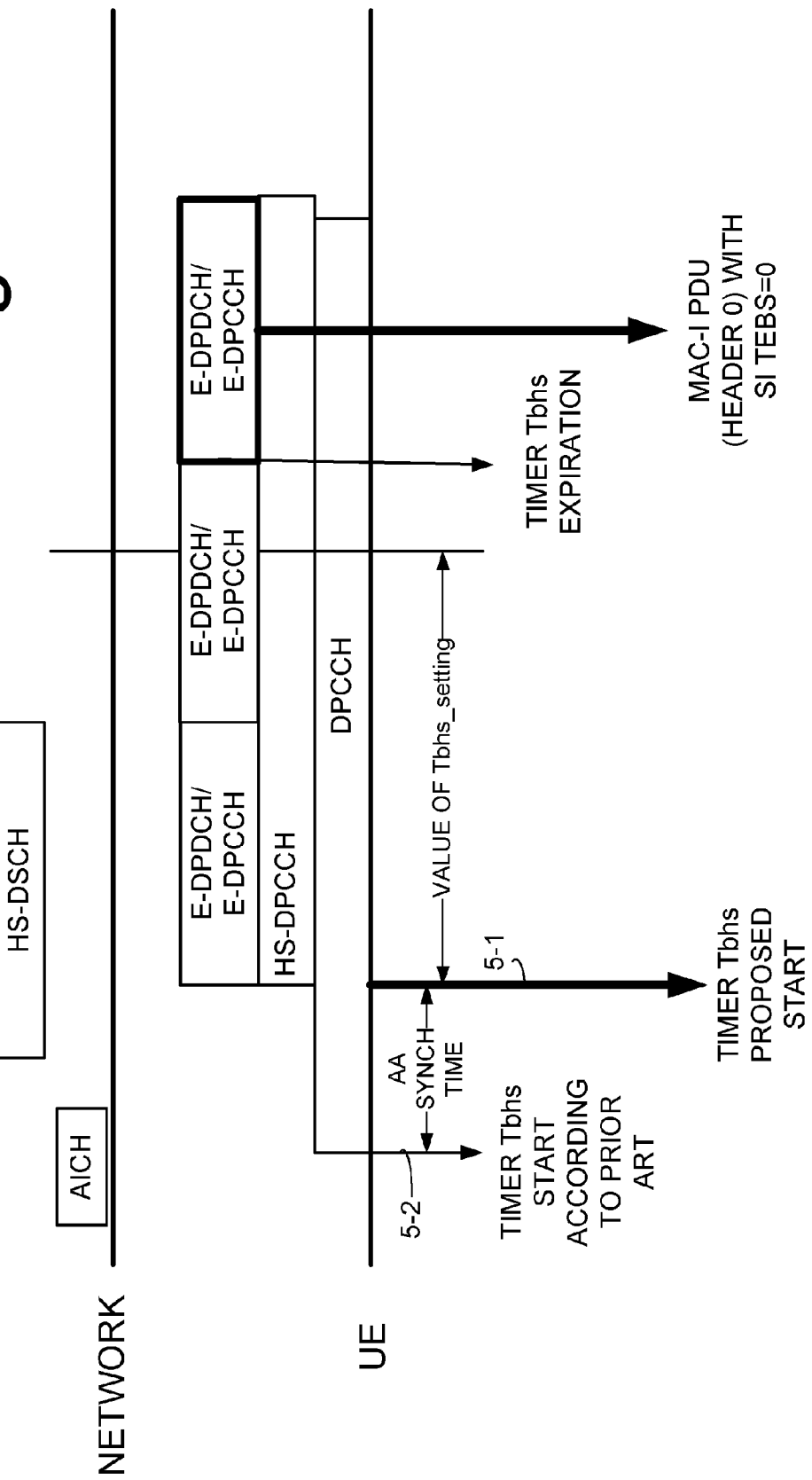
FIG. 6 is a schematic drawing illustrating operation or handling of the expiration of timer Tbhs.

FIG. 6 illustrates an example embodiment or mode in which the timer Tbhs finishes before another E_DCH transmission arrives. In this case it is not possible to transmit the scheduling information until then, with the result that the timer values can not be unsynchronized from the E-DCH transmissions times lest there be an extra time that is not considered by the timer. FIG. 6 illustrates the fact that when granularity of the Tbhs expiration time is finer that the TTI length, then wireless terminal cannot send the release indication (SI with TEBS=0) to the network until the following full TTI (e.g., if the timer times out at 32 ms then the SI is not sent until 40 ms if the TTI length is 10 ms and start at every even 10 ms, i.e. 10, 20, 30, 40 . . . ms).

In case the timer Tbhs is not started at the start of the HS-DPCCH transmission but is instead started when the DPCCH transmissions start, there may be complications. For example, if the Tbhs is set to a low value, the Tbhs timer may expire even before the HS-DPCCH has started. To alleviate this problem, even if the timber Tbhs is set before the AA synchronization time according to the prior art, the expiration time of the Tbhs timer should use a larger value if it is started during the DPCCH only period, i.e., during the AA synchronization period before the HS-DPCCH has been started. The length of the DPCCH only period is given by "AA synch time", and this value should be used to increase the timer setting. Hence, Tbhs expiration time="HS-DPCCH transmission continuation back off"+"AA synch time" should be used if timer is started before the HS-DPCCH. When the timer is reset after the start of HS-DPCCH, the expiration time of Tbhs="HS-DPCCH transmission continuation back off".

In an example embodiment and mode of the technology disclosed herein, if the Tbhs is started before HS-DPCCH transmission, then the expiration time of Tbhs="HS-DPCCH transmission continuation back off"+"AA synch time". If the Tbhs is started or reset after the start of HS-DPCCH transmission, then the expiration time of Tbhs="HS-DPCCH transmission continuation back off".

Reception of HS-SCCH Orders and Arrival of UL Data During Random Access Procedures The network sends HS-SCCH orders in order to allow the wireless terminal to send feedback and channel quality information (CQI) to the network. This action is mainly required when the network wants to improve the downlink (DL) spectrum efficiency for a bulk of data that wants to transmit to the wireless terminal. Since the wireless terminal can start random access due to incoming UL data, or it could receive UL meanwhile it is performing a random access due to a HS-SCCH command issued by the network, it creates some uncertainties on the behaviour of the wireless terminal that should be clarified.

The Wireless Terminal Gets UL Data During a Random Access Procedure Triggered by a HS-SCCH Order A wireless terminal that has been ordered to initiate a stand-alone HS-DPCCH and starts the random access procedure might have UL data arriving during the power ramping, during the synchronization AA procedure, or before contention resolution. Such cases could be confusing for the wireless terminal if it should start the Tbhs timer and when to start it, as well when to start the transmission of HS-DPCCH and what procedure to follow for contention resolution.

The timer is needed in the cases that the network has a fair amount of downlink (DL) data to transmit and since the Tbhs timer should not stopped upon arrival of UL data, in an example embodiment the following may be implemented to simplify handling of this situation:

- If the wireless terminal detects TEBS < > 0 during contention resolution, the wireless terminal can send the UL data directly after the contention resolution. The Tbhs starts after the contention resolution. The timer starts after the UL data transmission. As used herein, "contention resolution" refers to a procedure during the E-DCH setup when the network identifies the UE transmitting. If there are two simultaneous UEs with the same resource, the network will release one of them. The contention resolution procedure has a specific period of time and a separate time.
- If the wireless terminal detects TEBS < > 0 before the synchronization AA is terminated, the wireless terminal should not transmit the scheduling information (SI) (neither with TEBS=0 nor with TEBS < > 0). The wireless terminal instead transmit the UL data and HS-DPCCH when the sync AA is finished. This is only possible if Tbhs is started after the synchronization AA is completed; otherwise, the behavior should be as indicated in the bullet above.

These two simple rules, summarized above, allow the network and the wireless terminal to keep a mutual understanding of the timers and the current situation.

In accordance with an example embodiment and mode of the technology disclosed herein, if a wireless terminal detects TEBS < > 0 before the synchronization AA is completed, the wireless terminal should not transmit the SI (with TEBS=0 or TEBS < > 0). The UE instead transmits the UL data and HS-DPCCH when the sync AA is finished.

In accordance with an example embodiment and mode of the technology disclosed herein, if the wireless terminal detects TEBS < > 0 during contention resolution the wireless terminal can send the UL data directly after the contention resolution, the Tbhs starts after the contention resolution.

In case TEBS < > 0 is detected after the start of the HS-DPCCH transmission, the wireless terminal will follow the DL triggered procedure for stand-alone HS-DPCCH.

In an example embodiment, the wireless terminal may get a HS-SCCH order during a random access procedure triggered by incoming UL data A wireless terminal that has started the process of obtaining an E-DCH resource for the purpose of UL transmission, i.e., started the preamble ramping, but has not completed synchronization AA procedure, should ignore any HS-SCCH order to initiate a stand-alone HS-DPCCH. Instead it should follow the UL triggered procedure and start the HS-DPCCH after the collision resolution phase.

The motivation for this wireless terminal behavior is that the stand-alone HS-DPCCH is identified by the network through a SI with TEBS=0, sent at the start the collision resolution phase. This should not be sent for a wireless terminal with UL data in the buffer. If it is sent when the wireless terminal has UL data, it would cause confusion for the network. If not do so, it would increase the complexity for wireless terminal implementation, and it will affect the end user performance since it will have to delay UL transmissions similarly as it was explained above.

Since the Tbhs timer should not be stopped upon arrival of UL data, then the arrival of the HS-SCCH order can serve in this case as an indication for the wireless terminal to start the Tbhs timer if the order is received after the contention resolution has finished, at the same time as the new HS-DPCCH transmission takes place.

In accordance with an example embodiment and mode of the technology disclosed herein, if an HS-SCCH order is received during a random access procedure triggered by incoming UL data, the wireless terminal shall transmit the UL data and HS-DPCCH when the sync AA is finished.

In accordance with an example embodiment and mode of the technology disclosed herein, upon reception of HS-SCCH during an ongoing C-EDCH access triggered by UL, the wireless terminal shall start the Tbhs timer in the next transmission of HSDPCCH after the contention resolution has been completed.

Figure 7:
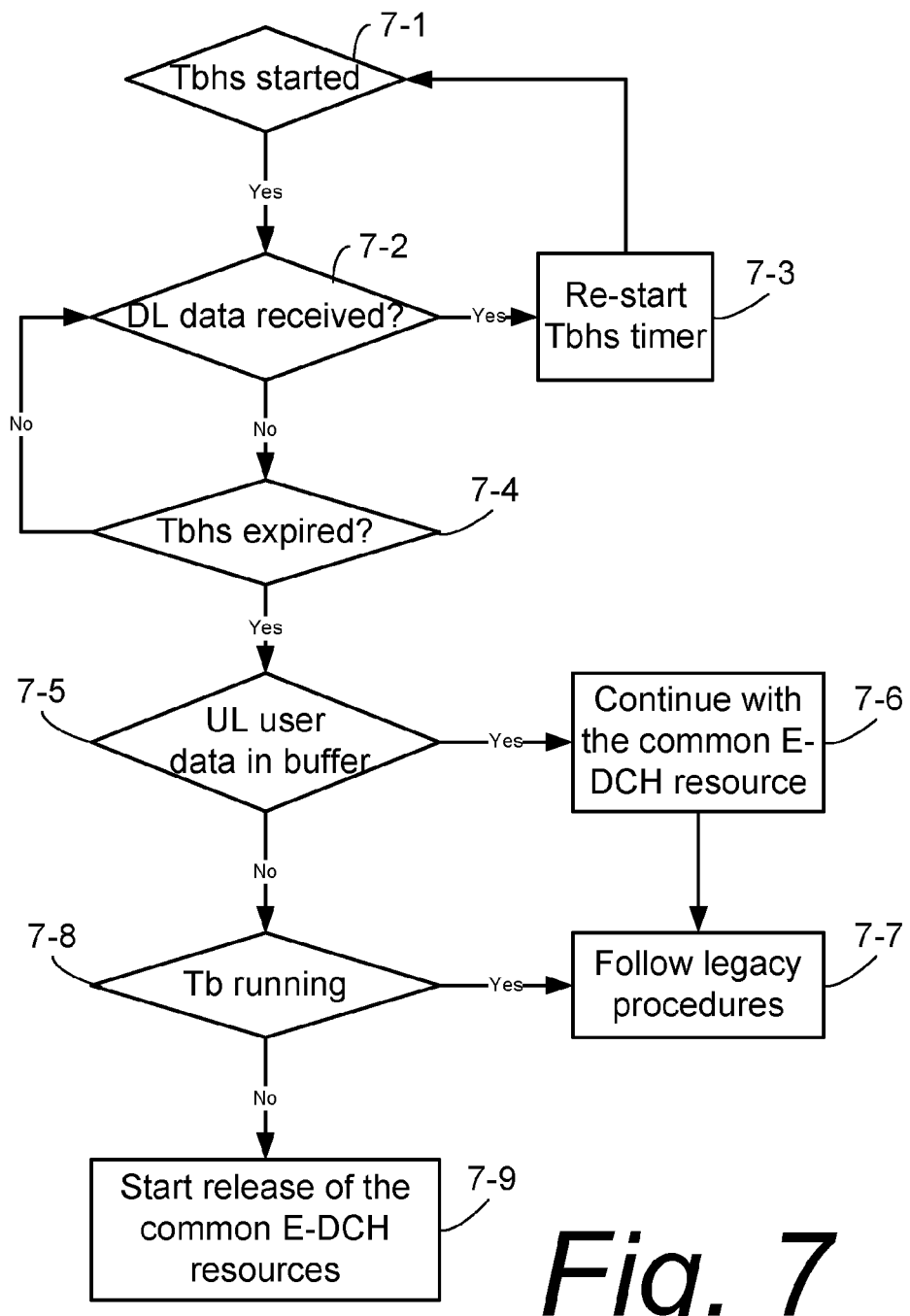
FIG. 7 is a flowchart showing example basic acts or steps comprising an example embodiment and mode of the technology disclosed herein.

FIG. 7 illustrates example acts or steps which comprise an example embodiment or mode of the technology disclosed herein. FIG. 7 particularly illustrates example acts or steps involved in operating a wireless terminal (e.g., of operating an E-DCH controller) in accordance with the foregoing. Act 7-1 of FIG. 7 depicts determining whether the Tbhs timer has been started. In FIG. 7, the Tbhs timer notation encompasses or comprises the new timer Tbhs timer mentioned above. When the Tbhs timer has been started, as act 7-2 the wireless terminal checks whether downlink (DL) data has been received. If downlink (DL) data has been received, as reflected by act 7-3 the Tbhs timer is restarted and a further check for receipt of downlink (DL) is performed (act 7-2). If downlink (DL) data has not been received, as act 7-4 a determination is made whether the Tbhs timer has expired. If the Tbhs timer has not expired, a further check for receipt of downlink (DL) is performed (act 7-2). If the Tbhs timer has expired, as act 7-5 a determination is made whether there is uplink (UL) user data in the buffer of the wireless terminal. If there is uplink (UL) user data in the buffer, the wireless terminal continues with the common E-DCH resource (act 7-6) and follows legacy procedures (act 7-7). If there is no uplink (UL) user data in the buffer, as act 7-8 a determination is made whether the Tb timer 52a is still running. If the Tb timer 52a is still running, the wireless terminal follows legacy procedures (act 7-7). But if the Tb timer 52a is not still running, as act 7-9 the E-DCH controller starts release of the common E-DCH resources.

The technology disclosed herein concerns and comprises implicit release with HS-DPCCH transmission continuation backoff. If the common E-DCH resource is allocated for NodeB triggered HS-DPCCH transmission, then implicit resource release is additionally enabled if "HS-DPCCH transmission continuation back off" is present. The timer Tbhs is set to "HS-DPCCH transmission continuation back off" value at the allowed start time of the E-DCH transmission. If TEBS < > 0 byte is detected while timer Tbhs is running, then the timer Tbhs is stopped. If a MAC-ehs PDU is received while timer Tbhs is running, then the timer is re-started. Once timer Tbhs is stopped, it is not started anymore for the duration of that E-DCH enhanced physical random access transmission procedure. If timer Tbhs expires, the MAC-STATUS-Ind primitive indicates to RLC for each logical channel that no PDUs shall be transferred to MAC. TEBS=0 byte is reported to the Node B MAC as SI in a MAC-i PDU. CMAC-STATUS-Ind which informs the RRC about the Enhanced Uplink in CELL_FACH state and Idle mode process termination is triggered when the empty buffer status has been reported and no MAC-i PDU is left in any HARQ process for (re-) transmission.

The technology disclosed herein concerns and comprises, in the context of implicit release with E-DCH transmission continuation backoff, that for NodeB triggered HS-DPCCH transmission, or for DTCH/DCCH transmission upon indication of reception of HS-SCCH order for NodeB triggered HS-DPCCH transmission from layer 1, the wireless terminal shall, if "HS-DPCCH transmission continuation back off" is present, set "E-DCH transmission continuation back off" equal to MAX("E-DCH transmission continuation back off", "HS-DPCCH transmission continuation back off") and use this value instead for the ongoing transmission.

If "HS-DPCCH transmission continuation back off" is not present, the wireless terminal sets "E-DCH transmission continuation back off" equal to "infinity" and uses this value instead for the ongoing transmission [MAX("infinity", any numerical value)="infinity"]. Thus, Implicit resource release is enabled only if "E-DCH transmission continuation back off" is not set to "infinity".

Figure 9:
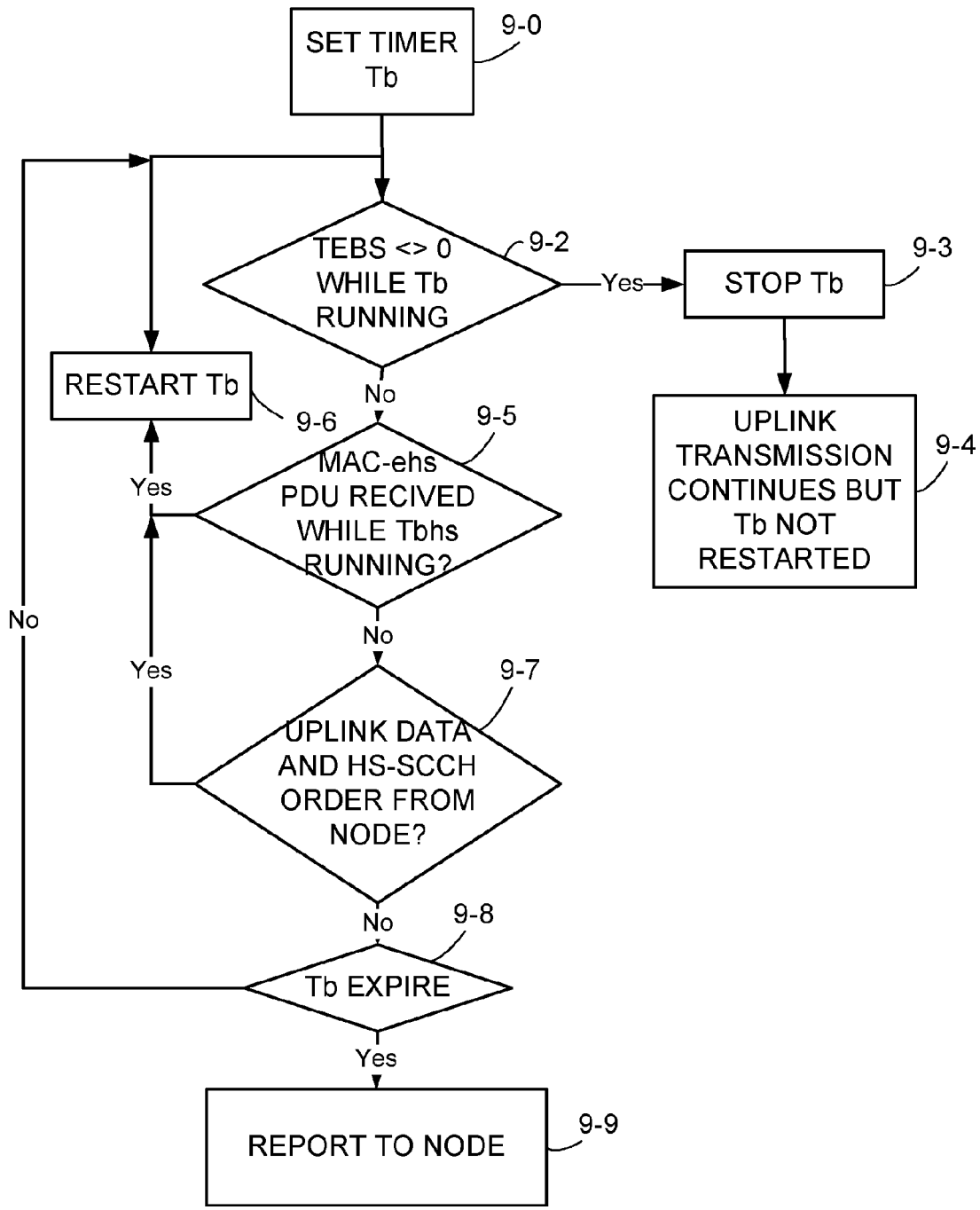
FIG. 9 is a flowchart showing example basic acts or steps comprising an example embodiment and mode of the technology disclosed herein.

Example acts or steps of an example embodiment are illustrated in FIG. 9. If implicit resource release is enabled, then in case of DTCH/DCCH transmission, as act 9-1 the timer Tb is set to "E-DCH transmission continuation back off" value, when TEBS is 0 byte and the last generated MAC-i PDU with higher layer data is provided with the PHY-data-REQ primitive to the physical layer for transmission.

As act 9-2, If TEBS < > 0 byte is detected while timer Tb is running, then the timer is stopped (act 9-3) and uplink data transmission on the common E-DCH resource continues (act 9-4).

If a MAC-ehs PDU is received while timer Tb is running (checked as act 9-5), then the timer is re-started (act 9-6). If the transmission procedure is triggered due to data on the uplink, then upon indication of reception of HS-SCCH order for NodeB triggered HS-DPCCH transmission from layer 1 (checked as act 9-7), the timer Tb is re-started, if running If the "E-DCH transmission continuation back off" value is set to "0" or if timer Tb expires (depicted by act 9-8), the MAC-STATUS-Ind primitive indicates to RLC for each logical channel that no PDUs shall be transferred to MAC. TEBS=0 byte is reported to the Node B MAC as SI in a MAC-i PDU (act 9-9). If the "E-DCH transmission continuation back off" value is set to "0", then the SI shall be transmitted with the MAC-i PDU carrying the last DCCH/DTCH data, given the serving grant is sufficient to carry the SI in the same MAC-i PDU together with the remaining DCCH/DTCH data. Otherwise, the empty buffer status report is transmitted separately with the next MAC-i PDU. CMAC-STATUS-Ind which informs the RRC about the Enhanced Uplink in CELL_FACH state and Idle mode process termination is triggered when the empty buffer status has been reported and no MAC-i PDU is left in any HARQ process for (re-)transmission.

Each of FIG. 1, FIG. 2, FIG. 3, and FIG. 4 show various units or functionalities as being framed by broken lines. For example, the E-DCH release timing signal generator of the base station node; the E-DCH controller of the wireless terminal 30; and the RRC manager of the radio network controller (RNC) node 26 are each depicted as optionally being framed by broken lines. Such broken line framing signifies that the framed functionalities or units may, in at least some example embodiments, be realized or comprised by a machine platform. The terminology "machine platform" is a way of describing how the framed functional units may be implemented or realized by machine. The machine platform may take any of several forms, such as (for example) electronic circuitry in the form of a computer implementation platform or a hardware circuit platform. A computer implementation of the machine platform may be realized by or implemented as one or more computer processors or controllers as those terms are herein expansively defined, and which may execute instructions stored on non-transient computer-readable storage media. In such a computer implementation the machine platform may comprise, in addition to a processor(s), a memory section (which in turn can comprise random access memory; read only memory; an application memory (a non-transitory computer readable medium which stores, e.g., coded non instructions which can be executed by the processor to perform acts described herein); and any other memory such as cache memory, for example). Another example platform is that of a hardware circuit, e.g., an application specific integrated circuit (ASIC) wherein circuit elements are structured and operated to perform the various acts described herein.

The following is a non-exhaustive list of abbreviations of possible interest:
AI Acquisition Indicator
AICH Acquisition Indicator Channel
ASC Access Service Class (TS 25.321)
C-EDCH Common-EDCH
CMAC MAC-C is the MAC deployed by the RACH layer
DPCCH Dedicated Physical Control Channel
CELL_DCH RRC State for Dedicated transmissions
CELL_FACH RRC State for Random access and short transmissions
CELL_PCH RRC State with a Cell Paging Channel monitoring
CQI Channel Quality Indicator
DRX Discontinuous Reception
E-AGCH E-DCH Absolute Grant Channel
E-AICH Enhanced AICH
E-AI Enhanced-Acquisition Indicator
E-DCH Enhanced Dedicated Channel
E-HICH E-DCH HARQ Acknowledgement Indicator Channel
E-RNTI E-DCH Radio Network Temporary Identifier
E-RGCH EDCH-Relative Grant Channel
F-DPCH Fractional-Dedicated Physical Channel
HARQ Hybrid Automatic repeat request
H-RNTI HSDPA-Radio Network Temporary Identifier
HS-DPCCH High Speed Dedicated Physical Control Channel
HW Hardware
NW Network
PRACH Physical Random Access Channel
RACH Random Access Channel
RLC Radio Link Protocol
RNTI Radio Network Temporary Identifier
RRC Radio Resource Control
SDU Service Data Unit
SI Scheduling Information
SIB System Information Block
SN Sequence Number
SNR Signal-to-Noise Ratio
TCP Transmission Control Protocol
TTI Transmission Time Interval
TX Transmission/Transmitter
UE User Equipment
UL Uplink
URA_PCH RRC state UEs are paged in a UTRAN Registration Area
WCDMA Wideband Code Division Multiple Access The technology disclosed thus encompasses the following non-limiting example embodiments:

Example Embodiment T1

A wireless terminal which is configured to communicate over a radio interface with a radio access network and which comprises:

a timer configured to determine when to release an Enhanced Dedicated Channel (E-DCH) resource utilized on an uplink from the wireless terminal to the network;

a timer controller configured to initialize or adjust the timer with a timer value received from the network, the timer value being [uniquely generated] for a mode in which the network has commanded the wireless terminal to request a common E-DCH resource.

Example Embodiment T1.1

The wireless terminal of example embodiment T1, wherein the timer value is greater than a "EDCH transmission continuation back off" value for a non-stand-alone HS-DPCCH mode.

Example Embodiment T2

The wireless terminal of example embodiment T1, wherein the wireless terminal comprises plural timers including a Tb timer and a Ths-dpcch timer, and wherein the timer controller is configured to set the timer value of the Tb timer as either a value of the Ths-dpcch timer or a maximum of an existing value of the Tb timer and the value of the Ths-dpcch timer.

Example Embodiment T3

The wireless terminal of example embodiment T1, wherein the timer value depends on traffic causing the timer to reset.

Example Embodiment T4

The wireless terminal of example embodiment T1, further comprising a communications interface through which the timer value is received from the network in a system information block.

Example Embodiment T5

The wireless terminal of example embodiment T1, further comprising a communications interface through which the timer value is received from the network in an HS-SCCH order signal.

Example Embodiment T5.1

The wireless terminal of example embodiment T5, wherein the HS-SCCH order signal is an order signal that initiates establishment of the stand-alone HS-DPCCH.

Example Embodiment T5.2

The wireless terminal of example embodiment T5, wherein the HS-SCCH order signal is a separate order signal than the order signal that initiated establishment of the stand-alone HS-DPCCH.

Example Embodiment T5.3

The wireless terminal of example embodiment T5, wherein the timer value is set in accordance with current E-DCH load.

Example Embodiment T6

The wireless terminal of example embodiment T1, wherein the timer includes both a first timer and a second timer, and wherein the timer controller is configured to reset the second timer upon receipt of downlink data and to not stop the second timer upon transmission of uplink data whereby both the first timer and the second timer may run simultaneously and the Enhanced Dedicated Channel (E-DCH) resource released upon expiration of either of the first timer and the second timer so long as the other of the first timer and the second timer is not running and the wireless terminal does not have uplink user data in its buffer.

Example Embodiment T7

The wireless terminal of example embodiment T1, wherein the timer determines when to release the E-DCH resource when the wireless terminal transmits only in a stand-alone HS-DPCCH by reason of a downlink transmission, and wherein:
for downlink (DL)-triggered HS-DPCCH the timer is started when the DPCCH transmission starts;
for downlink (DL)-triggered HS-DPCCH, the wireless terminal resets and restarts the timer when downlink data is received;
for downlink (DL)-triggered HS-DPCCH, when UL data on DTCH/DCCH is to be transmitted and/or detected at the wireless terminal, the timer is stopped and is not started as long as the wireless terminal has the E-DCH resource.

Example Embodiment T8

The wireless terminal of example embodiment T1, wherein the timer is started after a synchronization AA period and at a time that the wireless terminal is allowed to start its E-DCH transmissions.

Example Embodiment T9

The wireless terminal of example embodiment T1, wherein the timer is started when DPCCH transmissions start, and wherein an expiration time of the timer is at least set equal to a sum of "HS-DPCCH transmission continuation back off" and a "AA synch time"; and wherein the timer is reset after the start of HS-DPCCH.

Example Embodiment T10

The wireless terminal of example embodiment T1, wherein the timer value is set for the stand-alone HS-DPCCH mode as a maximum of "E-DCH transmission continuation back off" parameter and a "HS-DPCCH transmission continuation back off" parameter.

Example Embodiment T11

The wireless terminal of example embodiment T1, wherein the timer value is initially set to a "HS-DPCCH transmission continuation back off" parameter for the stand-alone HS-DPCCH mode but is set to a "E-DCH transmission continuation back off" parameter for a UL triggered E-DCH mode.

Example Embodiment T11.1

The wireless terminal of example embodiment T11, wherein on occurrence of uplink activity the timer value is reset to a maximum of an existing timer value and a "E-DCH transmission continuation back off" parameter.

Example Embodiment T11.2

The wireless terminal of example embodiment T11, wherein on occurrence of downlink activity the timer value is reset to a maximum of an existing timer value and a "HS-DPCCH transmission continuation back off" parameter.

Example Embodiment N1

A node of a radio access network which is configured to communicate over a radio interface with a wireless terminal and which comprises:
a signal generator configured to generate a timer value for use by the wireless terminal in determining when to release an Enhanced Dedicated Channel (E-DCH) resource utilized on an uplink from the wireless terminal to the network for a stand-alone HS-DPCCH mode in which the network has commanded the wireless terminal to request a common E-DCH resource;
a communications interface configured to transmit the timer value to the wireless terminal.

Example Embodiment N2

The node of example embodiment N1, wherein the signal generator is configured to set a timer value for a first timer as either a value of a second timer or a maximum of an existing value of the first timer and the value of the second timer.

Example Embodiment N3

The node of example embodiment N1, wherein the timer value depends on traffic causing the timer to reset.

Example Embodiment N4

The node of example embodiment N1, further comprising a communications interface through which the timer value is transmitted to the wireless terminal in a system information block.

Example Embodiment N5

The node of example embodiment N1, further comprising a communications interface through which the timer value is transmitted from the network in an HS-SCCH order signal.

Example Embodiment N5.1

The node of example embodiment N5, wherein the HS-SCCH order signal is a order signal that initiates establishment of a stand-alone HS-DPCCH.

Example Embodiment N5.2

The node of example embodiment N5, wherein the HS-SCCH order signal is a separate order signal than the order signal that initiated establishment of a stand-alone HS-DPCCH.

Example Embodiment N5.3

The node of example embodiment N5, wherein the timer value is set in accordance with current E-DCH load.

Example Embodiment N6

The node of example embodiment N1, wherein the timer determines when to release the E-DCH resource when the wireless terminal transmits only in a stand-alone HS-DPCCH by reason of a downlink transmission.

Example Embodiment N7

The node of example embodiment N1, wherein the timer value is set for the stand-alone HS-DPCCH mode as a maximum of "E-DCH transmission continuation back off" parameter and a "HS-DPCCH transmission continuation back off" parameter.

Example Embodiment M1

A method of operating a radio access network comprising a network node which is configured to communicate over a radio interface with a wireless terminal, the method comprising:

the network signaling a timer value to the wireless terminal for use in a mode wherein the network has commanded the wireless terminal to request a common E-DCH resource the wireless terminal initializing the timer with the timer value and, upon expiration of the timer, the wireless terminal releasing an Enhanced Dedicated Channel (E-DCH) resource utilized on an uplink from the wireless terminal to the network.

Example Embodiment M1.1

The method of example embodiment M1, wherein the timer value being greater than a "EDCH transmission continuation back off" value for a non-stand-alone HS-DPCCH mode.

Example Embodiment M2

The method of example embodiment M1, wherein the wireless terminal comprises plural timers including a first timer and a second timer, and further comprising the timer controller setting the timer value of the first timer as either a value of the second timer or a maximum of an existing value of the first timer and the value of the second timer.

Example Embodiment M3

The method of example embodiment M1, wherein the timer value depends on traffic causing the timer to reset.

Example Embodiment M4

The method of example embodiment M1, further comprising transmitting the timer value from the network to the wireless terminal in a system information block.

Example Embodiment M5

The method of example embodiment M1, further transmitting the timer value from the network to the wireless terminal in an HS-SCCH order signal.

Example Embodiment M5.1

The method of example embodiment M5, wherein the HS-SCCH order signal is an order signal that initiates establishment of a stand-alone HS-DPCCH.

Example Embodiment M5.2

The method of example embodiment M5, wherein the HS-SCCH order signal is a separate order signal than the order signal that initiated establishment of a stand-alone HS-DPCCH.

Example Embodiment M5.3

The method of example embodiment M5, further comprising setting the timer value in accordance with current E-DCH load.

Example Embodiment M6

The method of example embodiment M1, wherein the wireless terminal comprises plural timers including a first timer and a second timer, and further comprising the timer controller being configured to reset the second timer upon receipt of downlink data and to not stop the second timer upon transmission of uplink data whereby both the first timer and the second timer may run simultaneously and the Enhanced Dedicated Channel (E-DCH) resource released upon expiration of either of the first timer and the second timer so long as the other of the first timer and the second timer is not running and the wireless terminal does not have uplink user data in its buffer.

Example Embodiment M7

The method of example embodiment M1, wherein the timer determines when to release the E-DCH resource when the wireless terminal transmits only in a stand-alone HS-DPCCH by reason of a downlink transmission, and wherein:

for downlink (DL)-triggered HS-DPCCH, starting the timer when the DPCCH transmission starts;

for downlink (DL)-triggered HS-DPCCH, resetting and restarting the timer when downlink data is received;

for downlink (DL)-triggered HS-DPCCH, when UL data on DTCH/DCCH is to be transmitted and/or detected at the wireless terminal, stopping the timer and not starting the timer as long as the wireless terminal has the E-DCH resource.

Example Embodiment M8

The method of example embodiment M1, further comprising starting the timer after a synchronization AA period and at a time that the wireless terminal is allowed to start its E-DCH transmissions.

Example Embodiment M9

The method of example embodiment M1, further comprising:

staring the timer when DPCCH transmissions start;

setting an expiration time of the timer at least equal to a sum of "HS-DPCCH transmission continuation back off" and a "AA synch time"; and resetting the timer after the start of HS-DPCCH.

Example Embodiment M10

The method of example embodiment M1, further comprising setting the timer value for the stand-alone HS-DPCCH mode as a maximum of "E-DCH transmission continuation back off" parameter and a "HS-DPCCH transmission continuation back off" parameter.

Example Embodiment M11

The method of example embodiment M1, wherein the timer value is initially set to a "HS-DPCCH transmission continuation back off" parameter for the stand-alone HS-DPCCH mode but is set to a "E-DCH transmission continuation back off" parameter for a UL triggered E-DCH mode.

Example Embodiment M11.1

The method of example embodiment M11, wherein on occurrence of uplink activity the timer value is reset to a maximum of an existing timer value and a "E-DCH transmission continuation back off" parameter.

Example Embodiment M11.2

The method of example embodiment M11, wherein on occurrence of downlink activity the timer value is reset to a maximum of an existing timer value and a "HS-DPCCH transmission continuation back off" parameter.

Example Embodiment ST1

A wireless terminal which is configured to communicate over a radio interface with a radio access network and which comprises:
a timer configured to determine when to release an Enhanced Dedicated Channel (E-DCH) resource utilized on an uplink from the wireless terminal to the network, the timer including both a Tb timer and another timer;
a timer controller configured to reset the another timer upon receipt of downlink data and to not stop the another timer upon transmission of uplink data whereby both the Tb timer and the another timer may run simultaneously and the Enhanced Dedicated Channel (E-DCH) resource released upon expiration of either of the Tb timer and the another timer so long as the other of the Tb timer and the another timer is not running and the wireless terminal does not have uplink user data in its buffer.

Example Embodiment ST2

The wireless terminal of example embodiment ST1, wherein the another timer is a Tbhs timer.

Example Embodiment SM1

A method of operating a wireless terminal which comprises both a Tb timer and another timer, the method comprising:
resetting the another timer upon receipt of downlink data;
not stopping the another timer upon transmission of uplink data;
operating the Tb timer and the another timer simultaneously and releasing an Enhanced Dedicated Channel (E-DCH) resource released upon expiration of either of the Tb timer and the another timer so long as the other of the Tb timer and the another timer is not running and the wireless terminal does not have uplink user data in its buffer.

Example Embodiment P1

The definition of DL data to reset the new timer (Tbhs) is the reception of MAC-ehs PDU.

Example Embodiment P2

For DL triggered HS-DPCCH, the new Tbhs timer is started after the AA synchronization is completed.

Example Embodiment P3

The Tbhs timer is not stopped if TEBS < > 0 is detected.

Example Embodiment P4

SI with TEBS equal to zero should be sent when: a) Tbhs timer expires and the UE has no data in its buffer; b) In case Tb and Tbhs timer are running, when both timers have expired.

Example Embodiment P5

The configurable values for the timer settings of Tbhs, "HS-DPCCH transmission continuation back off" are [10, 20, 32, 40, 64, 80, 160, 320] ms and they are rounded up to the next E-DCH TTI of the C-EDCH resource deployed.

Example Embodiment P6

If the Tbhs is started before HS-DPCCH transmission, then the expiration time of Tbhs="HS-DPCCH transmission continuation back off"+"AA synch time". If the Tbhs is started or reset after the start of HS-DPCCH transmission, then the expiration time of Tbhs="HS-DPCCH transmission continuation back off".

Example Embodiment P7

If a UE detects TEBS < > 0 before the synchronization AA is completed, the UE should not transmit the SI (with TEBS=0 or TEBS < > 0). The UE instead transmit the UL data and HS-DPCCH when the sync AA is finished.

Example Embodiment P8

If the UE detects TEBS < > 0 during contention resolution the UE can send the UL data directly after the contention resolution. The Tbhs starts after the contention resolution.

Example Embodiment P9

If an HS-SCCH order is received during a random access procedure triggered by incoming UL data, the UE shall transmit the UL data and HS-DPCCH when the sync AA is finished.

Example Embodiment P10

Upon reception of HS-SCCH during an ongoing C-EDCH access triggered by UL, the UE shall start the Tbhs timer in the next transmission of HSDPCCH after the contention resolution has been completed.

References possibly pertinent to the technology disclosed herein include the following (all of which are incorporated herein by reference in their entireties):

TS. 25.331 Radio Resource Control (RRC); Protocol specification, V.10.7.0.

TS. 25.321 Medium Access Control (MAC) protocol specification, V.10.5.0.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A wireless terminal which is configured to communicate over a radio interface with a radio access network and which comprises:
   plural timers including a Tb timer and a Ths-dpcch timer configured to determine when to release an Enhanced Dedicated Channel (E-DCH) resource utilized on an uplink from the wireless terminal to the network; and
   a timer controller configured to set a timer value of the Tb timer as either a value of the Ths-dpcch timer or a maximum of an existing value of the Tb timer and the value of the Ths-dpcch timer;
   characterized in that the timer controller is configured to initialize or adjust the plural timers with the timer values received from the network, the timer values being for a stand-alone HS-DPCCH mode in which the network has commanded the wireless terminal to request a common E-DCH resource.

2. The wireless terminal of claim 1, wherein the timer value is set as a maximum of "E-DCH transmission continuation back off" parameter and a "HS-DPCCH transmission continuation back off" parameter.

3. The wireless terminal of claim 1, wherein the timer is started after a synchronization AA period and at a time that the wireless terminal is allowed to start its E-DCH transmissions.

4. The wireless terminal of claim 1, wherein the timer value depends on either traffic causing the timer to reset; and/or current E-DCH load.

5. The wireless terminal of claim 1, wherein the timer controller is configured:
   upon reception of a MAC-ehs PDU, to re-start the timer;
   to stop the timer upon receipt of data for uplink transmission;
   once the timer is stopped, to not start the timer for a duration of the E-DCH access; and
   wherein when the timer expires, the E-DCH is released.

6. The wireless terminal of claim 1, wherein the wireless terminal is configured to notify the network regarding release of the common E-DCH resources when either:
   (i) a Tbhs timer expires and the wireless terminal has no user data for uplink transmission in its buffer; or
   (ii) both the Tbhs timer and a Tb timer are running but have expired.

7. The wireless terminal of claim 1, wherein the wireless terminal is configured:
   to start the timer after contention resolution and to send uplink data to the network after contention resolution if during contention resolution a TEBS index representing total E-DCH buffer status is greater than or less than zero;
   not to transmit scheduling information if the TEBS index representing the total E-DCH buffer status is greater than or less than zero before a synchronization AA procedure is terminated, but to transmit uplink data and HS-DPCCH after the synchronization AA procedure is terminated.

8. A node of a radio access network which is configured to communicate over a radio interface with a wireless terminal and which comprises:
   a signal generator configured to generate a timer value for use by the wireless terminal in determining when to release an Enhanced Dedicated Channel (E-DCH) resource utilized on an uplink from the wireless terminal to the network, wherein the signal generator is configured to set a timer value for a first timer as either a value of a second timer or a maximum of an existing value of the first timer and the value of the second timer of the wireless terminal and;
   a communications interface configured to transmit the timer value to the wireless terminal;
   characterized in that the timer value is for a stand-alone HS-DPCCH mode in which the network has commanded the wireless terminal to request a common E-DCH resource.

9. The node of claim 8, wherein the timer value is set as a maximum of "E-DCH transmission continuation back off" parameter and a "HS-DPCCH transmission continuation back off" parameter.

10. The node of claim 8, wherein the timer value depends on either (1) traffic causing the timer to reset; and/or (2) current E-DCH load.

11. A method of operating a radio access network comprising a network node which is configured to communicate over a radio interface with a wireless terminal, the method comprising:
   the network signaling a timer value to the wireless terminal;
   the wireless terminal initializing the timer with the timer value and, upon expiration of the timer, the wireless terminal releasing an Enhanced Dedicated Channel resource utilized on an uplink from the wireless terminal to the network;
   characterized in that the time value is for use in a stand-alone HS-DPCCH mode wherein the network has commanded the wireless terminal to request a common E-DCH resource, and
   wherein the timer is started after contention resolution and uplink data is sent to the network after contention resolution if during contention resolution a TEBS index representing total E-DCH buffer status is greater than or less than zero and not transmitting scheduling information if the TEBS index representing the total E-DCH buffer status is greater than or less than zero before a synchronization AA procedure is terminated, but transmitting uplink data and HS-DPCCH after the synchronization AA procedure is terminated.

12. The method of claim 11, further comprising setting the timer value as a maximum of "E-DCH transmission continuation back off" parameter and a "HS-DPCCH transmission continuation back off" parameter.

13. The method of claim 11, wherein the wireless terminal comprises plural timers including a first timer and a second timer, and the method further comprises the timer controller setting the timer value of the first timer as either a value of the second timer or a maximum of an existing value of the first timer and the value of the second timer.

14. The method of claim 11, further comprising starting the timer after a synchronization AA period and at a time that the wireless terminal is allowed to start its E-DCH transmissions.

15. The method of claim 11, further comprising setting the timer value to depend on either (1) traffic causing the timer to reset; and/or (2) current E-DCH load.

16. The method of claim 11, further comprising:
  upon reception of a MAC-ehs PDU, re-starting the timer;
  stopping the timer upon receipt of data for uplink transmission;
  once the timer is stopped, not starting the timer for a duration of the E-DCH access;
  when the timer expires, releasing the E-DCH.

17. The method of claim 11, further comprising notifying the network regarding release of the common E-DCH resources when either:
  (i) a Tbhs timer expires and the wireless terminal has no user data for uplink transmission in its buffer;
  (ii) both the Tbhs timer and a Tb timer are running but have expired.

* * * * *